United States Patent [19]

Akashi et al.

[11] Patent Number: 5,634,141
[45] Date of Patent: May 27, 1997

[54] VISUAL AXIS DETECTION DEVICE CAPABLE OF REDUCING DETECTION ERRORS DUE TO VARIATIONS OF EYES AMONG INDIVIDUALS

[75] Inventors: Akira Akashi; Akira Yamada; Yoshiaki Irie, all of Yokohama; Akihiko Nagano, Ichihara, all of Japan

[73] Assignee: Canon Kabushiki Kaisha, Tokyo, Japan

[21] Appl. No.: 442,570

[22] Filed: May 16, 1995

Related U.S. Application Data

[63] Continuation of Ser. No. 116,765, Sep. 7, 1993.

[30] Foreign Application Priority Data

Sep. 7, 1992 [JP] Japan .................................. 4-262750
Oct. 29, 1992 [JP] Japan .................................. 4-291500

[51] Int. Cl.[6] .................................................. G03B 7/00
[52] U.S. Cl. .................................................. 396/51
[58] Field of Search ........................... 354/62, 219, 400, 354/402, 410, 432; 351/210

[56] References Cited

U.S. PATENT DOCUMENTS

| | | | |
|---|---|---|---|
| 4,574,314 | 3/1986 | Weinblatt | 354/400 |
| 4,950,069 | 8/1990 | Hutchinson | 354/62 |
| 5,182,443 | 1/1993 | Suda et al. | 250/201.2 |
| 5,214,466 | 5/1993 | Nagano et al. | 354/402 |
| 5,225,862 | 7/1993 | Nagano et al. | 354/62 |
| 5,245,371 | 9/1993 | Nagano et al. | 354/62 |
| 5,253,008 | 10/1993 | Konishi et al. | 354/402 |
| 5,260,734 | 11/1993 | Shinda | 354/219 |
| 5,280,312 | 1/1994 | Yamada et al. | 351/211 |
| 5,296,888 | 3/1994 | Yamada | 354/219 |
| 5,298,927 | 3/1994 | Konishi et al. | 351/211 |
| 5,386,258 | 1/1995 | Nagano | 354/400 |

FOREIGN PATENT DOCUMENTS

| | | |
|---|---|---|
| 1-274736 | 11/1989 | Japan . |
| 4-242630 | 8/1992 | Japan . |

*Primary Examiner*—Russell E. Adams
*Attorney, Agent, or Firm*—Fitzpatrick, Cella, Harper & Scinto

[57] ABSTRACT

A visual axis detection apparatus including a correction data storage section to store the correction data to correct errors in the detected visual information; an individual variation correction data detection system to detect the individual variation data related to the visual axis of an observer; a correction data updating section to update the correction data on the basis of the new individual variation data detected by the individual variation detection system and the correction data stored in the correction data storage section; and a visual axis correction section to correct the detected visual axis by use of the correction data updated by the correction data updating section and stored in the correction data storage section. The apparatus adds a weight to the already stored correction data in accordance with the individual variation data when obtaining individual variation data anew, and uses this weighted data as the correction data.

56 Claims, 23 Drawing Sheets

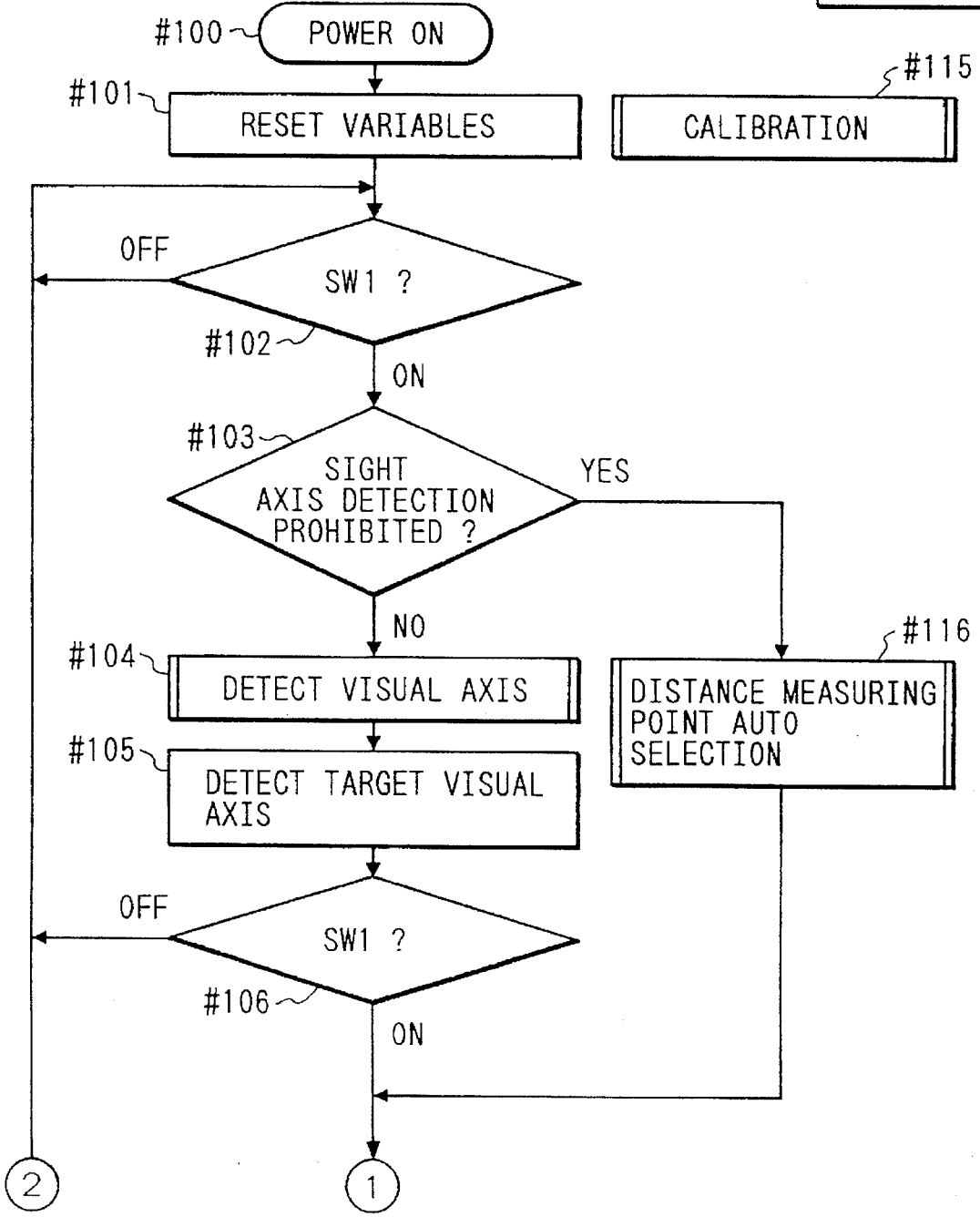

FIG. 24

| CALIBRATION DATA ON. | ax | ko | box | ky | boy | SPECTACLES | RELIABILITY |
|---|---|---|---|---|---|---|---|
| 0 | — | — | — | — | — | — | — |
| 1 | 0 | 0 | 0 | 0 | 0 | 1 | 0 |
| ... | ... | ... | ... | ... | ... | ... | ... |
| 5 | 1 | 0 | 0 | 0 | 0 | 1 | 0 |

VISUAL AXIS DETECTION DEVICE CAPABLE OF REDUCING DETECTION ERRORS DUE TO VARIATIONS OF EYES AMONG INDIVIDUALS

This application is a continuation, of application Ser. No. 08/116,765 filed Sep. 7, 1993.

BACKGROUND OF THE INVENTION

1. Field of the Invention

The present invention relates to the improvement of a visual axis detection device which detects the rotation angle of the visual axis of the eye of a user who looks in the finder field, and detects the user's visual axis in accordance with the detected rotation angle.

2. Related Background Art

There have hitherto been proposed various devices which detect the positions that an observer observes on the plane of observation, the so-called visual axis (sight axis) detection devices (eye-cameras, for example).

In Japanese Patent Laid Open Application No. 1-274736, for example, the parallel luminous fluxes from a light source are projected on the anterior eye portion of an eye of the observer to obtain the visual axis by utilizing the corneal reflex images by the reflected light from the cornea, and the image formation positions in the pupil.

Also, Japanese Laid-Open Patent Application No. 4-242630 (corresponding to Japanese Patent Application No. 3-11492) has proposed an optical device provided with a visual axis detection function to execute various kinds of photography using a correction data gathering function (hereinafter referred to as calibration) for correcting the variations of visual axes between individual observers.

FIG. 25 illustrates the visual axis detection method. FIGS. 26A and 26B illustrate an eyeball image protected on the plane of an image sensor 14 in FIG. 25, and the output intensity obtained from the image sensor 14, respectively.

Now, in conjunction with FIG. 25, FIGS. 26A and 26B, the visual axis detection method will be described.

Each of the infrared light emitting diodes 13a and 13b is arranged substantially symmetrically in the direction X with respect to the optical axis s of a photodetecting lens 12 and divergently illuminates the eyeball of an observer (photographer), respectively.

The infrared light projected from the infrared light emitting diode 13b each of them illuminates the cornea 16 of the eyeball 15. At this juncture, a corneal reflex image d made by a part of the infrared light reflected on the surface of the cornea 16 is converged by the photodetecting lens 12, thus being reimaged at a position d' on an image sensor 14.

Likewise, the infrared light projected from the infrared light emitting diode 13a illuminates the cornea 16 of the eyeball 15. At this juncture, a corneal reflex image e made by a part of the infrared light reflected on the surface of the cornea 16 is converged by the photodetecting lens 12, thus being reimaged at a position e' on the image sensor 14.

Also, the luminous fluxes from the end portions a and b of the iris 17 form the images of the end portions a and b at the positions a' and b' on the image sensor 14 through the photodetecting lens 12. When the rotation angle $\theta$ of the optical axis t with respect to the optical axis s of the photodetecting lens 12 is small, and given the coordinate X of the end portions a and b of the iris 17 as xa and xb, the coordinate xc of the central position of the pupil 19 is expressed as follows:

$$xc \cong (xa+xb)/2$$

Also, given the coordinates X of the positions in which the corneal reflex images d' and e' are generated as xd' and xe'; the standard distance between the curvature center o of the cornea 16 and the center c of the pupil 19 as $L_{oc}$, the coefficient with which to consider the individual variations of the distance $L_{oc}$ as A1, the rotation angle $\theta$ of the optical axis t of the eyeball 15 essentially satisfies the following relational equation because the coordinate X of the center points of the corneal reflex images d' and e' and the coordinate X xo of the curvature center o of the coordinate X agree with each other:

$$(A1*L_{oc})*\sin\theta \cong xc-(xd+xe)/2 \quad (1)$$

Therefore, it is possible to obtain the rotation angle $\theta$ of the optical axis t of the eyeball 15 by detecting the positions of each of the characteristic points (corneal reflex images d and e, and the end portions a and b of the iris 17) projected on a part of the image sensor 14 as shown in FIG. 26B in a visual axis operation processor. At this juncture, the above-mentioned equation (1) is rewritten as follows:

$$\beta(A1*L_{oc})*\sin\theta \cong (xa'+xb')/2-(xd'+xe')/2 \quad (2)$$

where $\beta$ is a magnification determined by the position of the eyeball 15 with respect to the photodetecting lens 12, and substantially, this is obtained as a function of the interval |xd'-xe'| of the corneal reflex images. The rotation angle $\theta$ of the optical axis t of the eyeball 15 is rewritten as follows:

$$\theta \cong ARCSIN\{(xc'-xf')/\beta/(A1*L_{oc})\} \quad (3)$$

where $$xc' \cong (xa'+xb')/2$$

$$xf' \cong (xd'+xe')/2$$

Now, since the optical axis t of the eyeball 15 of the photographer and the visual axis do not agree, the visual axis $\theta$H of the photographer in the horizonal direction is obtained by executing an angle correction $\delta$ between the visual axis and optical axis t when the rotation angle $\theta$ of the optical axis t in the horizontal direction has been obtained. Given the coefficient with which to consider the individual variations with respect to the angle correction $\delta$ between the optical axis t of the eyeball 15 and visual axis as B1, the visual axis of the photographer in the horizontal direction $\theta$H is obtained as follows:

$$\theta H = \theta \pm (B1*\delta) \quad (4)$$

where the sign "±" is such that if the eye of the photographer who looks in the observation device is his left eye, the sign "+" is selected, and if it is his right eye, the sign "−" is selected provided that the rotation angle is positive when it rotates towards the right with respect to the photographer.

Also, in FIG. 26B, while an example in which the eyeball of the photographer rotates in the plane Z-X (horizontal plane, for example) is shown, it is possible to execute the same kind of detection when the eyeball of the photographer rotates in the plane X-Y (vertical plane, for example). However, since the component of the visual axis of the photographer in the vertical direction agrees with the component $\theta$' of the optical axis t of the eyeball 15 in the vertical direction, the visual axis $\theta$H in the vertical direction is:

$$\theta V = \theta'$$

Further, the positions (xn and yn) on the imaging plate in the finder field which the photographer looks in can be obtained as follows based upon the visual axis data θH and θV:

$$xn \equiv m*\theta H \equiv m*[ARCSIN\{(xc'-xf)/\beta/(A1*L_{oc})\} \pm (B*\alpha)] \quad (5)$$

$$yn \equiv m\theta V$$

where m is a constant which is determined by the finder optical systems of a camera.

Here, the coefficients A1 and B1 with which to correct the individual variations of the eyeball 15 of a photographer are obtained in such a manner that the photographer is requested to gaze at the visual targets arranged in given positions in the finder of a camera, and that the positions of the visual targets and the position of the gazing point calculated in accordance with the above-mentioned equation (5) are brought to agree with each other.

Usually, the operation to obtain the visual axis of a photographer and the point he looks at attentively is executed by the application of a software for the visual axis operation processor of a microcomputer.

Also, the coefficient with which to correct the individual variations of the visual axis usually corresponds to the rotation of the eyeball of a photographer in the horizontal direction. Thus, the two visual targets arranged in the finder of a camera are set in the horizontal direction with respect to the photographer.

The coefficient for the correction of the individual variations of the visual axis is obtained and, when the position on the imaging plate of the visual axis of the photographer who looks in the finder of a camera is calculated by using above equation (5), the visual axis information thus obtained will be utilized for the focus adjustment of a photographing lens, the exposure control, or the like.

As the gathering of the correction data for correcting errors due to the individual variations of the visual axis, that is, the calibration method, there has been proposed a method in which the visual axis data and pupil diameters of a photographer are collected at the time of the open aperture of a photographing lens and the minimum aperture thereof, that is, the diameters of the photgrapher's pupil eventually, because the ratio between the visual axis and the rotation angle of the eyeball depends on the luminance of an object to be observed at that time, and then, on the basis of the information thus obtained, the correction data are gathered.

However, in the foregoing calibration method, the photographer's pupil diameter does not change considerably at the time of the diaphragm of the photographing lens fully open or brought to the maximum step down. As a result, there is automatically a limit in precisely obtaining the exact data on the individual variations by depending on the variations of the pupil diameter.

Also, the correction data are gathered uniquely from the individual variation data for one time. Hence, if such individual variation data contain errors, there has been a problem that the correction data obtained therefrom also contain errors accordingly.

SUMMARY OF THE INVENTION

It is an object of the present invention to provide a visual axis detection device capable of reducing errors in the visual axis detection.

It is another object of the present invention to provide a device comprising correction data storage means which stores the correction data for correcting errors in the detected visual axis; individual variation data detection means to detect the individual variation data on the visual axis of an observer; correction data updating means to update the correction data on the basis of the new individual variation data detected by the foregoing individual variation data detection means as well as of the correction data stored in the foregoing correction data storage means; and visual axis operation means to correct the detected data by use of the correction data which are updated by the foregoing correction data updating means and stored in the foregoing correction data storage means; thus wieghting with the individual variation data the corrected data already stored when a new individual variation data is obtained, and using this weighted data as the corrected data.

On the other hand, there is a process in which prime data are obtained several times for securing an individual variation data once. At that time, the observer should give his fixed gaze at a given target in a given position on the observing plane, but if an inspection time is long, the observer's visual axis tends to move. Therefore, the obtained value contains the information of rotation angle based on such movement, and there is a possibility that using such a value the calculated individual axis correction coefficient contains errors inevitably.

It is still another object of the present invention to provide an apparatus provided with a visual detection device comprising photodetecting means to receive the rays of light from an observer's eyeball, and operating means to calculate the rotation angles of the observer's eyeball in accordance with the eyeball images obtained by the foregoing photodetecting means, and further, to obtain the observing position on the observation plane after having corrected the individual variation of the observer's visual axis by use of the foregoing rotation angles, and the means for obtaining the visual axis correction coefficient, which detects the rotation angles of the observer's eyeball several times in order to correct the individual variations of the visual axis, and this means being arranged to calculate the foregoing visual axis correction coefficient by excluding the rotation angles whose difference between the average value θ of the eyeball rotation angles and the rotation angle of each eyeball is greater than a given value (θth).

BRIEF DESCRIPTION OF THE DRAWINGS

FIG. 24 is a table illustrating the kinds and initial values of the calibrations according to the present embodiment.

DETAILED DESCRIPTION OF THE PREFERRED EMBODIMENTS

Figure 1:
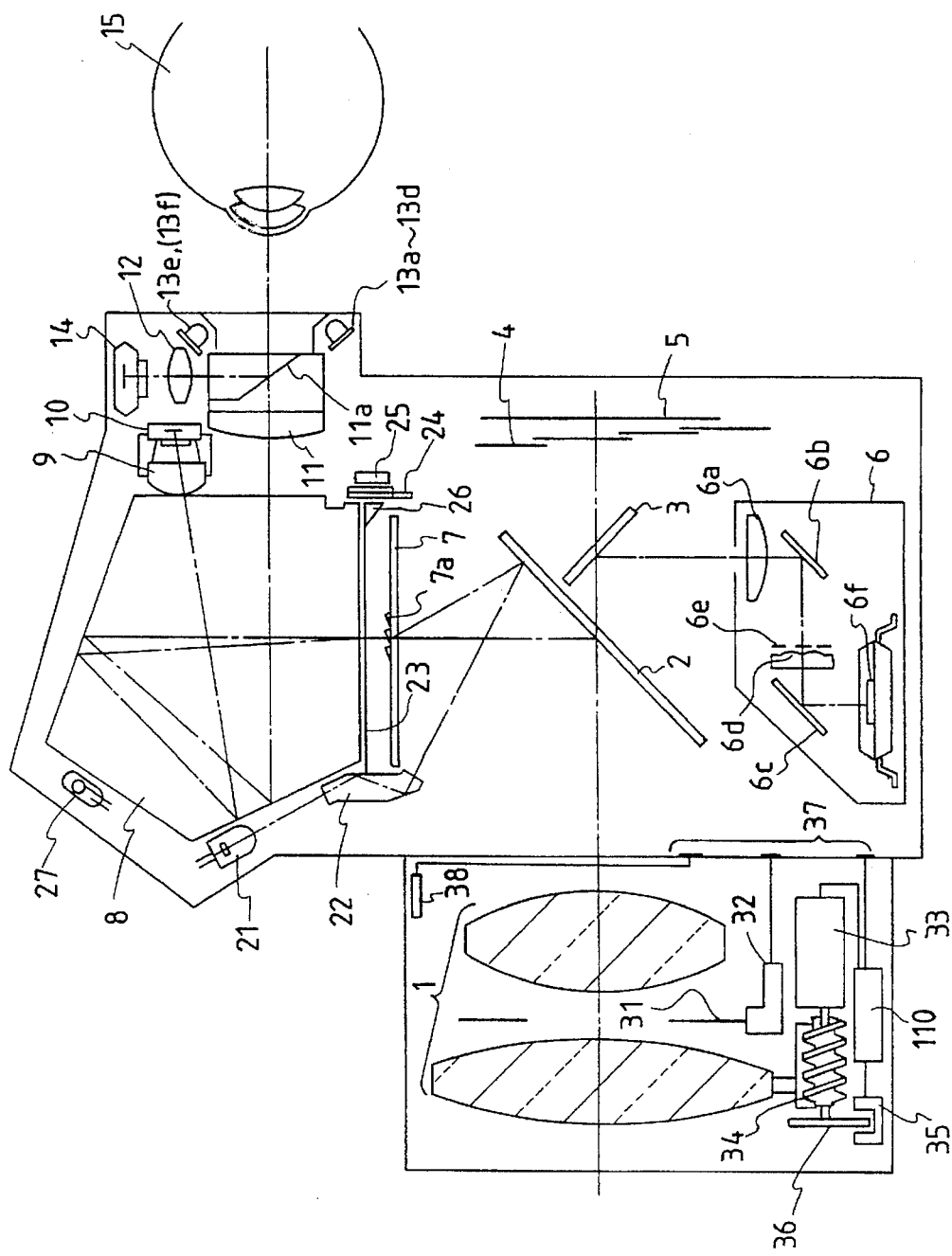
FIG. 1 is a view showing the principal structure of an embodiment in which the present invention is applied to a single-lens reflex camera.

Hereinafter, in conjunction with FIG. 1, the description will be made of the present invention in accordance with an example in which it is applied to a camera having a visual axis detection device. Before the description of such an application of the present invention, a method will be described for correcting the individual variations of the visual axis according to the present embodiment.

At first, regarding the horizontal direction, it is assumed that the visual axis coordinate x in the horizontal direction is obtainable by the following equation provided that the eyeball rotation angle in the horizontal direction is $\theta x$, and the diameter of the pupil at that time is Rpp:

$$x=m*\{\theta x-(cx*Rpp+dx)\}/(ax*Rpp+bx) \quad (6)$$

where m is a constant for the conversion coefficient of the rotation angle and coordinates, and ax to dx are the individual variation correction coefficients regarding the horizontal direction, which are calculated from the individual variation data.

Now, since the measured rotation angle $\theta x$ depends on the diameter of the pupil Rpp, the following relation can be expressed:

$$\theta x=Kx*Rpp+Lx \quad (7)$$

Assuming that the Kx and Lx in the above-mentioned equation (7) are the primary functions of the visual axis coordinates, the relation can be expressed as follows:

$$Kx=ax*x/m+cx \quad (8)$$

$$Lx=bx*x/m+dx \quad (9)$$

The visual target 1 (horizontal coordinate x1) is observed by a certain luminance, and given the rotation angle as $\theta x1$ and the diameter of the pupil as Rpp1 at that time, the relation can be expressed as follows:

$$\theta x=Kx1*Rpp1+Lx1 \quad (7')$$

$$Kx1=ax*x1/m+cx \quad (8')$$

$$Lx1=bx*x1/m+dx \quad (9')$$

Likewise, in the visual targets 2 (horizontal coordinate x2), the relation can be expressed as follows:

$$\theta x2=Kx2*Rpp2+Lx2 \quad (7'')$$

$$Kx2=ax*x2/m+cx \quad (8'')$$

$$Lx2=bx*x2/m+dx \quad (9'')$$

When the kx1 and Lx1 in the above-mentioned equation (7') and Kx2 and Lx2 in the above-mentioned equation (7'') are determined by the method which will be described later, the following is obtainable by the above-mentioned equations (8') and (8''):

$$ax=\{m*(Kx1-Kx2)\}/(x1-x2) \quad (10)$$

$$cx=(Kx1+Kx2)/2 \quad (11)$$

and by the above-mentioned equations (9') and (9''):

$$bx=\{(m*(Kx1-Kx2)\}/(x1-x2) \quad (12)$$

$$dx=(Kx1+Kx2)/2 \quad (13)$$

Now, regarding the vertical direction, it is assumed that the visual axis coordinate y in the vertical direction is obtainable by the following equation provided that the eyeball rotation angle in the vertical direction is $\theta y$, and the diameter of the pupil at that time is Rpp:

$$y=m*\{\theta y-(cy*Rpp+dy)\}/(ay*Rpp+by) \quad (14)$$

where m is a constant for the conversion coefficient of the rotation angle and coordinates as described above, and ay to dy are the individual variation correction coefficients regarding the vertical direction, which are calculated from the individual variation data.

Now, since the measured rotation angle ey depends on the diameter of the pupil Rpp, the following relation can be expressed:

$$\theta y=Ky*Rpp+Ly \quad (15)$$

Assuming that the Ky and Ly in the above-mentioned equation (15) are the primary functions of the visual axis coordinates, the relation can be expressed as follows:

$$Ky=ay*y/m+cy \quad (16)$$

$$Ly=by*y/m+cy \quad (17)$$

Now, whereas the two visual targets for the calibration are arranged apart from each other in the horizontal direction, these are of the same coordinate in the vertical direction. Therefore, the individual variation coefficients ax to dx in the horizontal direction can be obtained as above, but it is impossible to obtain the individual variation coefficients ay to dy in the same manner.

As a result, the following assumption is given to the denominator of the equation (14):

$$ay* Rpp+by=ax* Rpp+bx=\text{constant}$$

Hence, $$ay=0 \quad (18)$$

$$by=ax*Rpp_{ABE}+bx=\text{constant} \quad (19)$$

Where the $Rpp_{ABE}$ represents the averaged pupil diameter of those detected plural times.

From the above-mentioned equations (16) and (17), the following is obtainable:

$$cy=Ky \quad (20)$$

$$dy=Ly-by*y/m$$

Here, since the visual axis coordinate in the vertical direction is zero, the following is obtainable:

$$dy=Ly \quad (21)$$

Now, the method for obtaining Kx1, Lx1, Kx2, Lx2, Ky, and Ly will be described.

The fundamental way to obtain them is that in the calibration operation the plural $\theta x$, $\theta y$, and Rpp are inputted at time intervals, and stored, which are used to determine the Kx1 to Ly in order to satisfy the equations (7) and (15) as much as possible. To this end, calculation by the simple mean and the method of least squares are adopted. In the first place, it is required to detect the dependence of the eyeball rotation angles $\theta x$ and $\theta y$ on the pupil diameter Rpp. Therefore, if the plural values of the pupil diameters thus stored do not show any great changes, the simple mean is applied for obtaining Kx1 and Lx1 or Kx2 and Lx2, or Ky and Ly. If the changes are great, the method of least squares is applied to obtaining the Kx1 to Lx. When the number of input data is small, the simple mean is naturally used of course. More specifically, the following calculation will be executed:

In a certain calibration operation, given the data at the time of observing the visual target 1 on the right-side end as [$\theta x1$, $\theta y1$, and Rpx1], and the data at the time of observing the visual target 2 on the left-side end, as [$\theta x2$, $\theta y2$, and Rpx2], the relation can be expressed as follows:

$$\theta y=(\theta y1+\theta y2)/2$$

$$Rpy=(Rpx1+Rpx2)/2$$

Now, given the number of the accumulated data as n, and the threshold value whereby to determine a method to be adopted for the calculation of the coefficients Kx1 to Ly, as ns, and then, A) when the number of data is n<ns (two pieces, for example), or the variation (or deviation value) of the pupil diameter Rpp is small, the Kx1 to Ly are calculated by the following equation using the simple mean:

$$Kx1=0 \quad (22)$$

$$Lx1=\Sigma\theta x1/n \quad (23)$$

$$Kx2=0 \quad (24)$$

$$Lx2=\Sigma\theta x2/n \quad (25)$$

$$Ky=0 \quad (26)$$

$$Ly=\Sigma\theta y/n \quad (27)$$

B) When the number of data is $n \geq ns$, and the variation of the pupil diameter is great, the Kx1 to Ly are calculated by the following equation using the method of least squares:

$$Kx1=(n\Sigma Rpx1*\theta x1-\Sigma Rpx1*\Sigma\theta x1)/\{n\Sigma Rpx1^2-(\Sigma Rpx1)^2\} \quad (28)$$

$$Lx1=(\Sigma Rpx1^2*\theta x1-\Sigma Rpx1\Sigma Rpx1*\theta x1)/\{n\Sigma Rpx1^2-(\Sigma Rpx1)^2\} \quad (29)$$

$$Kx2=(n\Sigma Rpx2*\theta x2-\Sigma Rpx2*\Sigma\theta x2)/\{n\Sigma Rpx2^2-(\Sigma Rpx2)^2\} \quad (30)$$

$$Lx2=(\Sigma Rpx2^2*\Sigma\theta x2-\Sigma Rpx2*\Sigma Rpx2*\theta x2)/\{n\Sigma Rpx2^2-(\Sigma Rpx2)^2\} \quad (31)$$

$$Ky=(n\Sigma Rpy*\theta y-\Sigma Rpy*\Sigma\theta y)/\{n\Sigma Rpy^2-(\Sigma Rpy)^2\} \quad (32)$$

$$Ly=(n\Sigma Rpy*\Sigma\theta y-\Sigma Rpy*\Sigma Rpy*\theta Y)/\{n\Sigma Rpy^2-(\Sigma Rpy)^2\} \quad (33)$$

Further, according to the present invention, when each of the $\Sigma$s is calculated in the above-mentioned case B), it is arranged that the priority should be given to a new data.

In general, when an equipment is used, the more the same operation is repeated, the more proficient will become the user. From this point of view, the top priority is given to the newest data on the individual variations in the calibration operation.

More specifically, when the above-mentioned $\Sigma Rpx1$, $\Sigma\theta x1$, $\Sigma Rpx1*\theta x1$, $\Sigma Rpx1^2$, and n are respectively replaced by Rx1, Tx1, RTx1, RSx1, and Nx1; $\Sigma Rpx2$, $\Sigma\theta x2$, $\Sigma Rpx2*\theta x2$, $\Sigma Rpx2^2$, and n are respectively replaced by Rx2, Tx2, RTx2, RSx2, and Nx2; and $\Sigma Rpy$, $\Sigma\theta y$, $\Sigma Rpy*\theta y$, $\Sigma Rpy^2$, and n are respectively replaced by Ry, Ty, RTy, RSy, and Ny, the above-mentioned equations (28) to (33) will change as follows:

$$Kx1=(Nx1*RTx1-Rx1*Tx1)/(Nx1*RSx1-Rx1^2) \quad (34)$$

$$Lx1=(RSx1*Tx1-Rx1*RTx1)/(Nx1*RSx1-Rx1^2) \quad (35)$$

$$Kx2=(Nx2*RTx2-Rx2*Tx2)/(Nx2*RSx2-Rx2^2) \quad (36)$$

$$Lx2=(RSx2*Tx2-Rx2*RTx2)/(Nx2*RSx2-Rx2^2) \quad (37)$$

$$Ky=(Ny*RTy-Ry*Ty)/(Ny*RSy-Ry^2) \quad (38)$$

$$Ly=(RSy*Ty-Ry*RTy)/(Ny*RSy-Ry^2)\text{tm} \quad (39)$$

Then, in order to give priority to the newest data as much as possible, the Rx1, Tx1, RTx1, RSx1, and Nx1 are calculated as follows:

When the newest pupil diameter Rpx1 and eyeball rotation angle $\theta x1$ are obtained, the mean value mRx1 of the stored data on the pupil diameters is calculated:

$$mRx1=Rx1/Nx1 \quad (40)$$

and then, a weighted coefficient w is calculated as follows, for example:

$$Rdx1=|mRx1-Rpx1| \quad (41)$$

1) In a case of Rdx1>Rdth (4 mm, for example), (which is the case where the difference between the stored data on the pupil diameters and the new pupil diameter is sufficiently great):

w=1.0

2) In a case of Rdx1≦Rdth (which is the case where the difference between the stored data on the pupil diameters and the new pupil diameter is small):

w=cwa*Rdx1+cwb cwa=0.025 and cwa=0.9, for example. Using the weighted coefficient w, the Rx1, Tx1, RTx1, RSx1, and Nx1 are calculated by the following equations:

$$Rx1=Rx1*w+Rpx1 \qquad (42)$$

$$Tx1=Tx1*w+\theta x1 \qquad (43)$$

$$RTx1=RTx1*w+Rpx1\theta x1 \qquad (44)$$

$$RSx1=RSx1*w+Rpx1^2 \qquad (45)$$

$$Nx1=Nx1*w+1 \qquad (46)$$

In other words, if the new value of the pupil diameter is sufficiently different from the mean value of the stored pupil diameters, it is interpreted that the luminance is different between the stored data and the new data at the time of obtaining them, and the weight added is made greater in order to utilize the stored data. On the contrary, if the values are not different, it is interpreted that the data are obtained when the luminance is almost the same, and the weight added to the stored data is made small so that the priority will be given to the newest data.

Figure 2A:
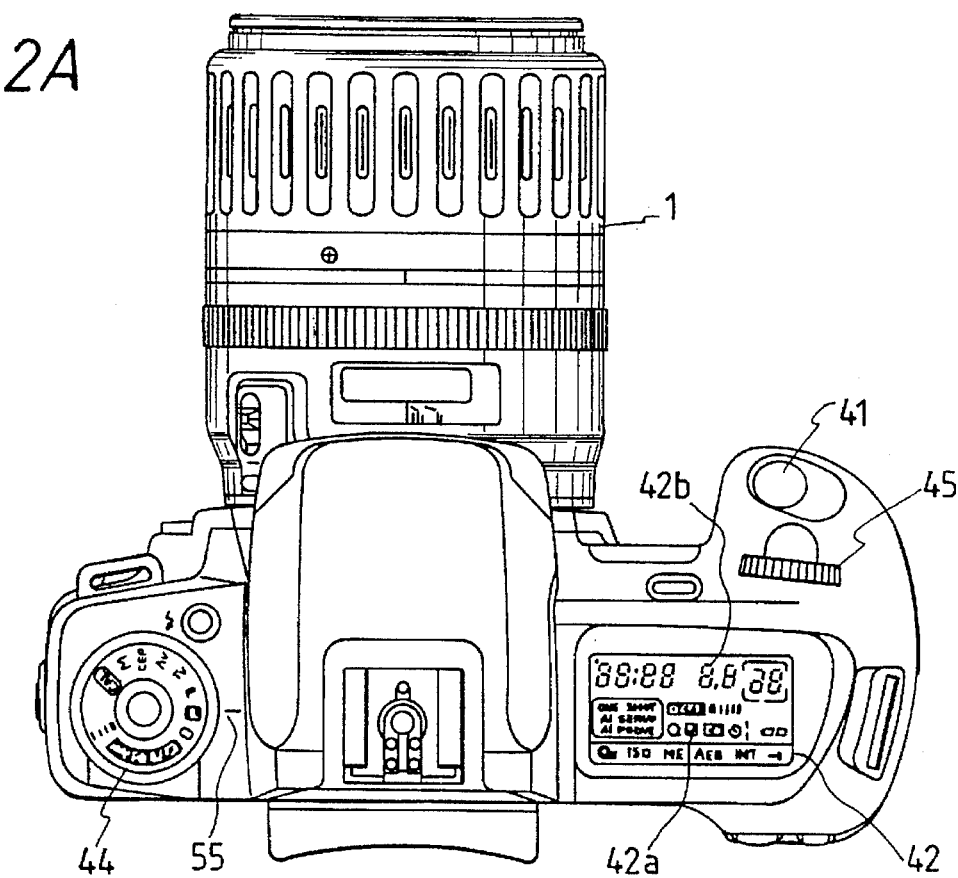
FIGS. 2A and 2B are views respectively, showing the top and bottom of the single-lens reflex camera shown in FIG. 1, respectively.
Figure 2B:
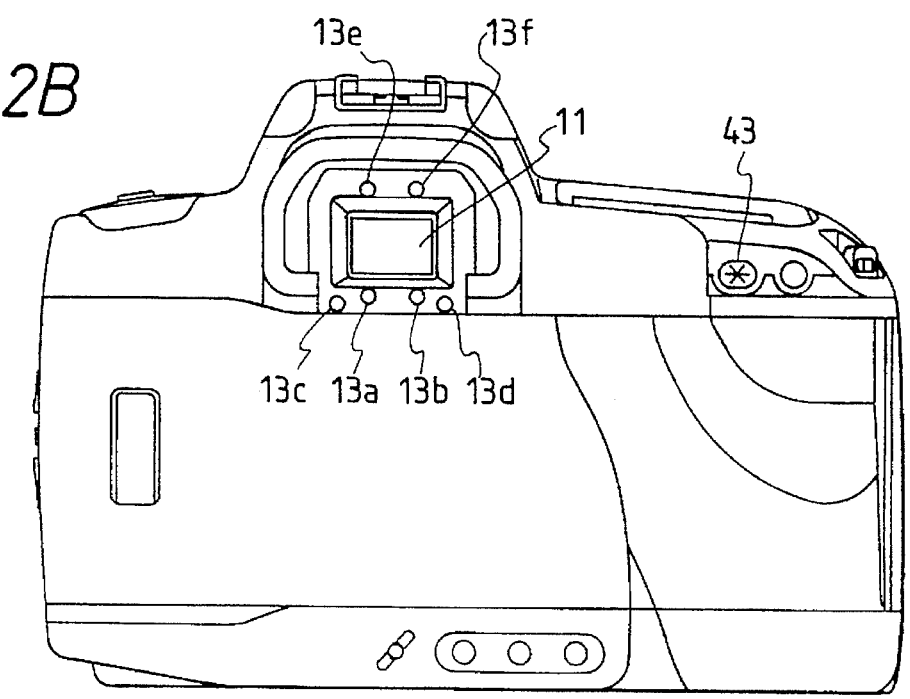
Figure 3:
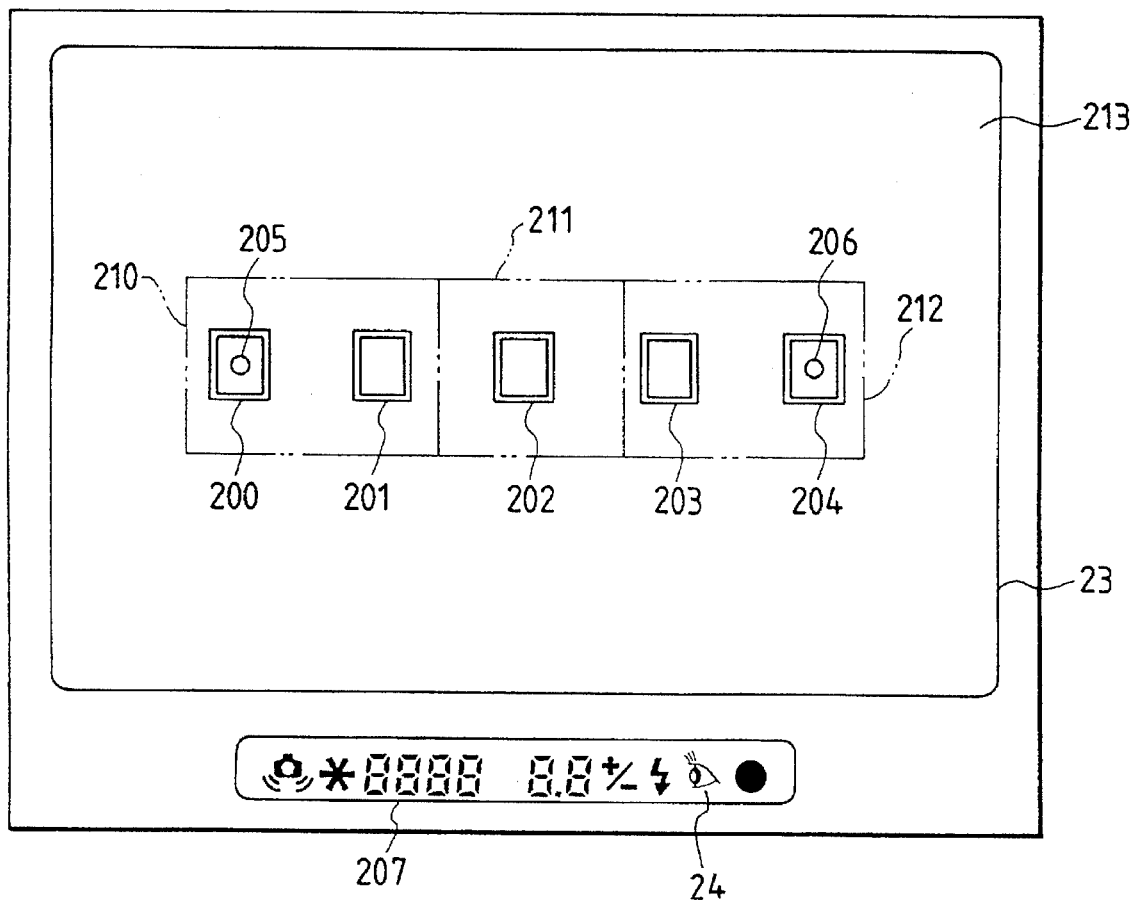
FIG. 3 is a view illustrating the interior of the finder field shown in FIG. 1.

FIG. 1 is a view schematically showing the principal structure of an embodiment in which an optical device having the above-mentioned correction method of the individual variations of the visual axis is applied to a single-lens reflex camera. FIGS. 2A and 2B are schematic views showing the upper and rear ends thereof. FIG. 3 illustrates the interior of the finder field shown in FIG. 1.

In FIG. 1 to FIG. 3, a reference numeral 1 designates a photographing lens. This is represented by two lenses for convenience' sake, but it is actually structured by many more numbers of lenses; 2, a main mirror which is inclinable or retractable depending on whether it is in an observing condition of an objective image by means of the finder systems or in a condition to photograph the objective image; and 3, a sub-mirror which reflects the luminous flux transmitting the main mirror 2 to the focus detection device 6 arranged in the lower part of the camera body, which will be described later.

A reference numeral 4 designates a shutter, and 5, a photosensitive member such as a silver salt film, a CCD, a solid state imaging device of MOS type or the like, or a vidicon and some other image pickup tube.

A reference numeral 6 designates a focus detection device comprising a field lens 6a arranged in the vicinity of the image formation plane, reflection mirrors 6b and 6c, secondary image formation lens 6d, diaphragm 6e, a line sensor 6f having a plurality of CCDs, and some others.

The focus detection device 6 in the present embodiment uses the known phase difference method for the focus detection. As shown in FIG. 3, this device is structured to make plural regions (five locations) in the image observing plane (finder field) as its measuring points, thus making the focus detectable by the application of the measuring points.

A reference numeral 7 designates an imaging plate arranged on the plane where the image formation is anticipated by the photographing lens 1; 8, a pentagonal prism for changing the finder light path; 9 and 10, an image formation lens and a photometry lens to measure the luminance of the objective image in the image observing plane, respectively. The image formation lens 9 functions to make the imaging plate 7 and the photometric sensor 10 conjugative through the reflected light path in the pentagonal prism 8.

Now, behind the exit of the pentagonal prism 8, an eyepiece 11 having a light splitter 11a is arranged for use of the observation of the imaging plate 7 by the eye 15 of a photographer. The light splitter 11a comprises a dichromic mirror, which transmits the visible light while reflecting the infrared light, for example.

A reference numeral 12 designates a light receiving lens; 14, an image sensor having the arrays of the photoelectric conversion elements such as CCDs, which are arranged two-dimensionally to be conjugative with a part near the pupil of the photographer's eyeball 15 specifically positioned with respect to the light receiving lens 12; and 13a to 13f, infrared light emitting diodes each serving as an illuminating light source arranged in the circumference of the eyepiece lens 11 as shown in FIG. 2B.

A reference numeral 21 designates a high-luminance superimpose LED which can be visually identified even in a bright object. The light emitted from this LED is reflected by the main mirror 2 through a projection prism 22 and bent in the vertical direction by the fine prism array 7a arranged in the display unit in the imaging plate 7. Thus, the emitted light reaches the photographer's eye 15 through the pentagonal prism 8 and eyepiece lens 11.

In this respect, the fine prism array 7a is arranged in the form of a frame in the plural positions (measuring points) corresponding to the focus detection regions of the imaging plate 7, which are respectively illuminated by the corresponding five superimpose LEDs 21 (each of them is designated by the reference marks LED-L1, LED-L2, LED-C, LED-R1 and LED-R2).

With this arrangement, each of the measuring point marks 200, 201, 202, 203, and 204 is brightened in the finder field as clear from the view of the finder field shown in FIG. 3, thus enabling the focus detection regions (measuring points) to be indicated (hereinafter referred to as superimpose indication).

Here, in the measuring point marks 200 and 204 on the left and right side ends, dot marks 205 and 206 are inscribed to constitute the visual targets at the time of calibration, that is, when gathering the visual axis correction data required to correct errors in the visual detection due to the individual variations of the eyeball, which will be described later.

A reference numeral 23 designates a field mask which forms the finder field regions, and 24, the LCD In the finder which is arranged to enable the photographing information to be displayed on an area outside the finder field, and is illuminated by an illumination LED (F-LED) 25.

The light which has passed the LCD 24 in the finder is induced into the finder field by means of a triangle prism 26, and appears in the area outside the finder field as shown at 207 in FIG. 3, thus enabling the photographer to know the photographing information; and 27, a known mercury switch for the detection of the camera position.

A reference numeral 31 designates a diaphragm provided in the photographing lens 1; 32, a diaphragm driving device including the diaphragm driving circuit which will be described later; 33, a lens driving motor; 34, a lens driving member comprising driving gears and others; 35, a photocoupler which detects the rotation of a pulse plate 36 interlocked with the foregoing lens driving member 34 and transmits the detected rotation to a lens focus adjusting circuit 110: the focus adjusting circuit 110 drives the foregoing lens driving motor 33 for a given amount in accordance with this information as well as the information regarding the lens driving amount to be received from the camera side in order to shift the photographing lens 1 to the focus position; and 37, a mounting contact which serves as an interface between a known camera and the lens.

In FIGS. 2A and 2B, a reference numeral 41 designates a release button; 42, a monitor LCD serving as an external monitor display, which comprises a fixed segmental display unit 42a to display the predetermined patterns, and a seven-segmental display unit 42b to execute the variable numerical display; 43, an AE locking button which holds photometric values; 44, a mode dial whereby to select a photographing mode and others; and 55, an indicator. Any other operational members are not directly concerned with the present invention, and the description thereof will be omitted.

Figure 4A:
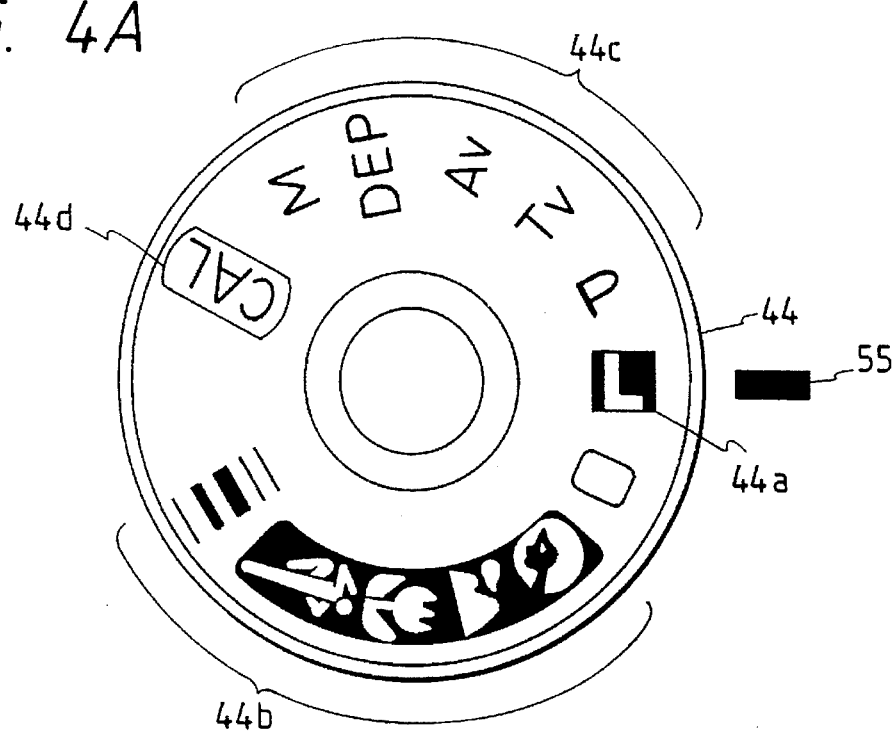
FIGS. 4A and 4B are views illustrating the mode dial shown in FIGS. 2A.
Figure 4B:
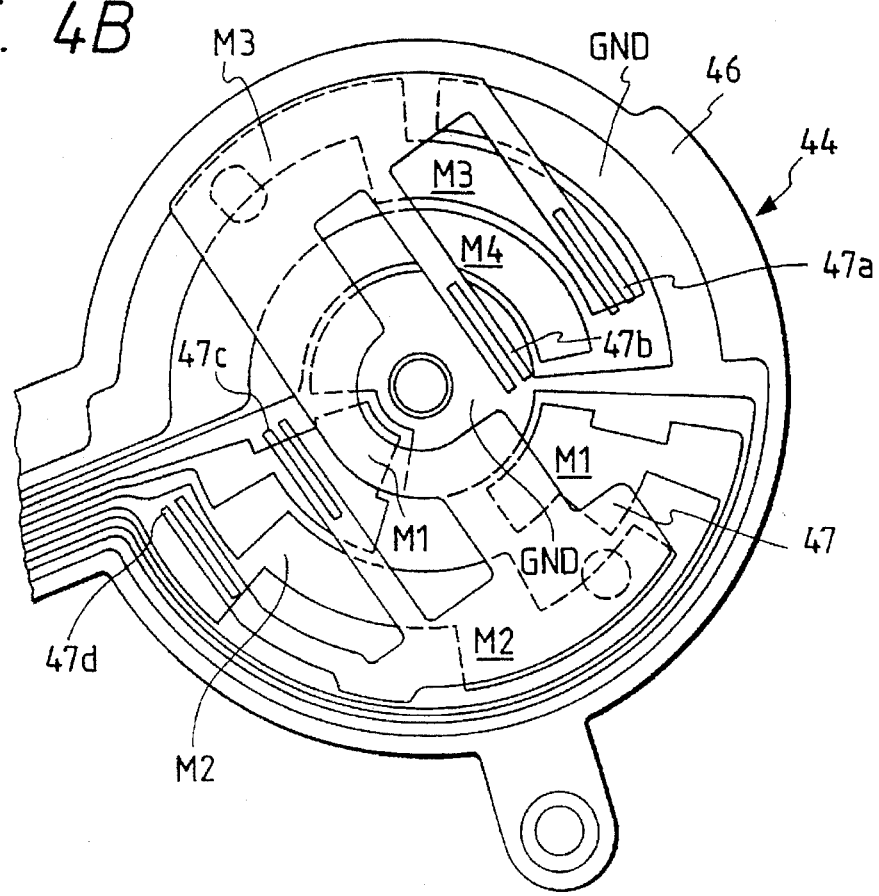

FIGS. 4A and 4B are views showing the structure of the foregoing mode dial 44. When setting the indication of a content on the dial at the indicator 55 inscribed on the camera body, the photographing mode is ready accordingly.

In FIG. 4A, a reference numeral 44a designates a locking position to make the camera inoperative; 44b, the automatic photographing mode position where the camera is controlled by the photographing program prepared in advance; 44c, the manual photographing mode position which includes a programmed AE, shutter preference AE, diaphragm preference AE, object depth preference AE, and manual exposure, thus enabling the photographer to set the photographing conditions himself; and 44d, the "CAL" position to make the calibration mode ready for the execution of the visual axis calibration which will be described later.

FIG. 4B illustrates the interior structure of the mode dial 44, in which a reference numeral 46 designates a flexible printed circuit board having switch patterns (M1, M2, M3, and M4) serving as the mode dial switch, and a GND pattern arranged as shown in FIG. 4B. It is then made possible to set 12 positions as indicated by the mode dial 44 in four bits by sliding the four contacts (47a, 47b, 47c, and 47d) of the switch contact 47 which is interlocked with the rotation of the mode dial 44.

Now, reverting to FIGS. 2A and 2B, a reference numeral 45 designates an electronic dial which generates click pulses when rotated in order to select a setting value that may be selected further in the mode already selected by the mode dial 44. Here, the structure is so arranged that if, for example, the shutter preference photographing mode is selected by use of the mode dial 44, a shutter speed currently set is displayed on the finder LCD 24 and monitor LCD 42, and then, when the photographer rotates the electronic dial 45, the shutter speed orderly changes from the one currently set in either way depending on the direction in which the electronic dial rotates.

Figure 5A:
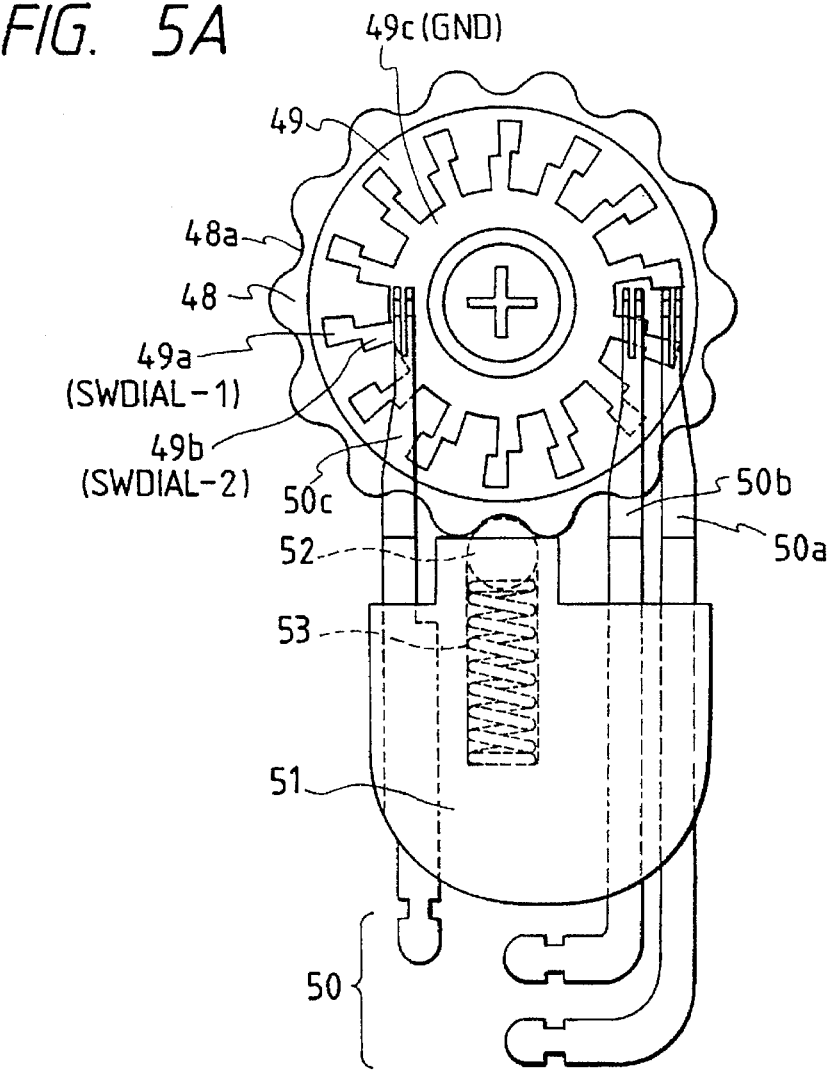
FIGS. 5A and 5B are views respectively illustrating the electronic dial shown and related timing chart of the electronic dial in FIGS. 2A and 2B.
Figure 5B:
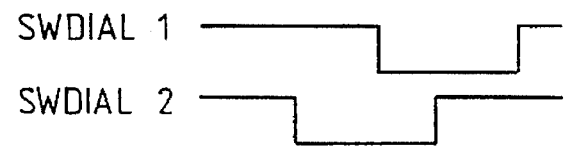
Figure 5B:
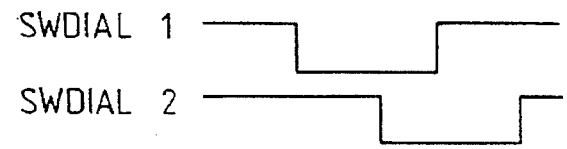

FIGS. 5A and is a detailed view showing the interior structure of the above-mentioned electronic dial 45. FIG. 5B is a timing chart related to the operation of the electronic dial shown in FIG. 5A.

In FIGS. 5A and 5B, a clicking plate 48 is arranged to rotate together with the electronic dial 45. On this plate, a printed board 49 is fixed. On the printed board 49, switch patterns 49a (SWDIAL-1) and 49b (SWDIAL-2) and a GND pattern 49c are arranged as shown in FIGS. 5A and 5B. A switch contact 50 having three sliding contacts 50a, 50b, and 50c is fixed to a fixing member 51.

A clicking ball 52 is arranged to fit in each of the recesses 48a formed on the outer circumference of the clicking plate 48. A coil spring 53 is held by the fixing member 51 to give bias to this ball.

Also, in the normal position (where the clicking ball 52 fits in the recess 48a), the sliding contacts 50a and 50b are not in contact with the switch patterns 49a and 49b at all.

In the electronic dial 45 thus formed, when the photographer rotates the dial clockwise in FIG. 5A, the sliding contact 50a abuts upon the switch pattern 49a at first. Then the sliding contact 50b abuts upon the switch pattern 49a. The set value is counted up in this timing. When the dial rotates counter clockwise, the relationship between the sliding contacts and the switch patterns is just opposite, and the set value is counted down in the same timing.

FIG. 5B is a timing chart showing this state, and represents the pulse signals generated on the switch patterns 49a and 49b as well as its timing when the electronic dial rotates. The upper diagram represents a case of one click rotation counter clockwise. The lower diagram represents a case of one click rotation clockwise. In this way, the timing and rotational directions of the count up and down are detected.

Figure 6:
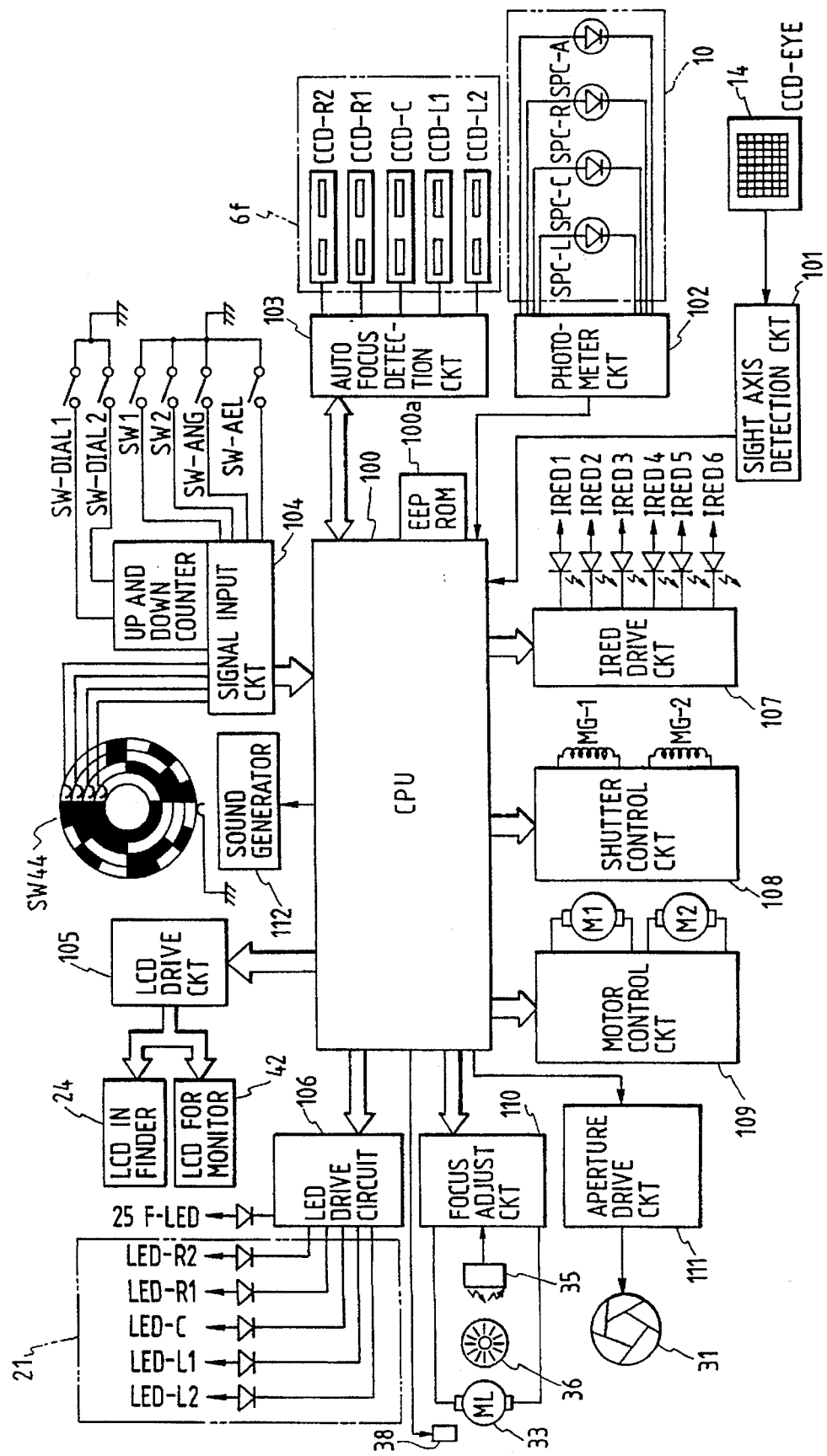
FIG. 6 is a block diagram showing the principal structure of the single-lens reflex camera shown in FIG. 1.

FIG. 6 is a view illustrating electric circuits incorporated in a single-lens reflex camera having the above-mentioned structure, and the same parts as in FIG. 1 are designated by the same reference characters.

In the central processing unit (CPU) 100 of a microcomputer incorporated in the camera body, a visual detection circuit 101, photometric circuit 102, automatic focus detection circuit 103, signal input circuit 104, LCD driving circuit 105, LED driving circuit 106, IRED driving circuit 107, shutter control circuit 108, motor control circuit 109, and sound generator 112 are connected. Also, signals are transmitted to the focus adjusting circuit 110 and diaphragm driving circuit 111 in the photographing lens 1 through the mount contact 37 shown in FIG. 1.

The EEPROM 100a which accompanies the CPU 100 has a function as a storage to store the visual axis correction data required to correct the individual variations of the visual axis. When the "CAL" position is brought to the indicator 55 for the mode dial 44, it is possible to select the calibration mode for gathering the calibration data for the correction of the individual variations of the visual axis, thus making the electronic dial 45 ready for the selection of the calibration number corresponding to each calibration data, turning off of the calibration operation, and setting up of the prohibition mode of the visual axis detection.

The plural calibration data can be set and effectively classified by the people who use the camera, and different states of observation even by a single user, that is, the observer uses his spectacles or not, or he uses any particular lenses for correcting his eyesight or not, for example.

Also, the calibrations numbers selected at that time or the set state of the visual axis prohibition mode is stored in the EEPROM 100a as calibration data numbers (1, 2, . . ., or zero), which will be described later.

The foregoing visual axis detection circuit 101 A/D converts the signals of the eyeball image from the image sensor 14 (CCD-EYE), and transmits this image information to the CPU 100. As described later, the CPU 100 extracts in accordance with a given algorithm each characteristic point of the eyeball image which is required for the execution of the visual axis detection, and calculates the visual axis of the photographer by use of the position of each of the characteristic points.

The foregoing photometric circuit 102 compresses logarithm and A/D converts the signals from the photometric sensor 10 after having amplified it, and transmits them to the CPU 100 as the luminance information of each sensor. The photometric sensor 10 comprises the four photodiodes which execute the photometry in four regions as shown in FIG. 3, that is, the SPC-L conducting the photometry in the left-side region 210 including the left-side distance measuring points 200 and 201 in the finder field, CSPC-C conducting the photometry in the central region 211 including the distance measuring point 202, SPC-R conducting the photometry in the right-side region including the right-side distance measuring points 203 and 204, and SPC-A conducting the photometry in the circumferential region 213 around these three regions.

The line sensor 6f is a known CCD line sensor comprising the five sets of line sensors CCD-L2, CCD-L1, CCD-C, CCD-R1, and CCD-R2 corresponding to the five distance measuring points 200 to 204 in the image plane.

The foregoing automatic focus detection circuit 103 A/D converts the voltage obtained from the above-mentioned line sensors 6f and transmits it to the CPU 100.

Reference characters SW-1 designate a switch which is turned on by the first stroke of the release button 41 to initiate a photometry, AF, visual axis detection operation, and the like; SW-2, a release switch which is turned on by the second stroke of the release button; SW-ANG, a camera position detection switch which detects the position by means of the mercury switch 27 shown in FIG. 1; SW-AEL, an AE locking switch which is turned on by depressing the AE locking button 43; SW-DIAL1 and SW-DIAL2, the dial switches provided in the electronic dial 45 already described, which are connected to the input of the up-down counter of the signal input circuit 104 for counting the amount of the rotational clicking of the electronic dial 45; SW-M1 to M4, dial switches provided in the mode dial 44 which has already been described.

The status signals of these switches are inputted into the signal input circuit 104, and transmitted to the CPU 100 through the data bus.

The foregoing LCD driving circuit 105 is of a known structure which drives the liquid crystal display LCD for its display, and is capable of displaying simultaneously both on the monitor LCD 42 and finder LCD 24 the diaphragm values, shutter seconds, currently set photographing mode, and others in accordance with the signals from the CPU 100.

The foregoing LED driving circuit 106 controls the illumination LED (F-LED) 25 and superimpose LED 21 to be turned on and off.

The foregoing IRED driving circuit 107 selectively turns on the infrared light emitting diodes (IRED1 to 6) 13a to 13f as required by the situations.

The foregoing shutter control circuit 108 controls the magnet MG-1 which enables the first blind to run when charged, and the magnet MG-2 which enables the second blind to run in order to give a predetermined luminous energy to a sensitive member for exposure.

The foregoing motor control circuit 109 controls the motor M1 which winds up and rewinds the film and the motor M2 which charges the main mirror 2 and shutter 4.

With the above-mentioned shutter control circuit 108 and motor control circuit 109, a series of the camera release sequence operation is executed.

The above-mentioned sound generator 112 is used either as an indication of the completion of the correction data gathering or as a warning indication when the correction data gathering has failed.

Figure 7A:
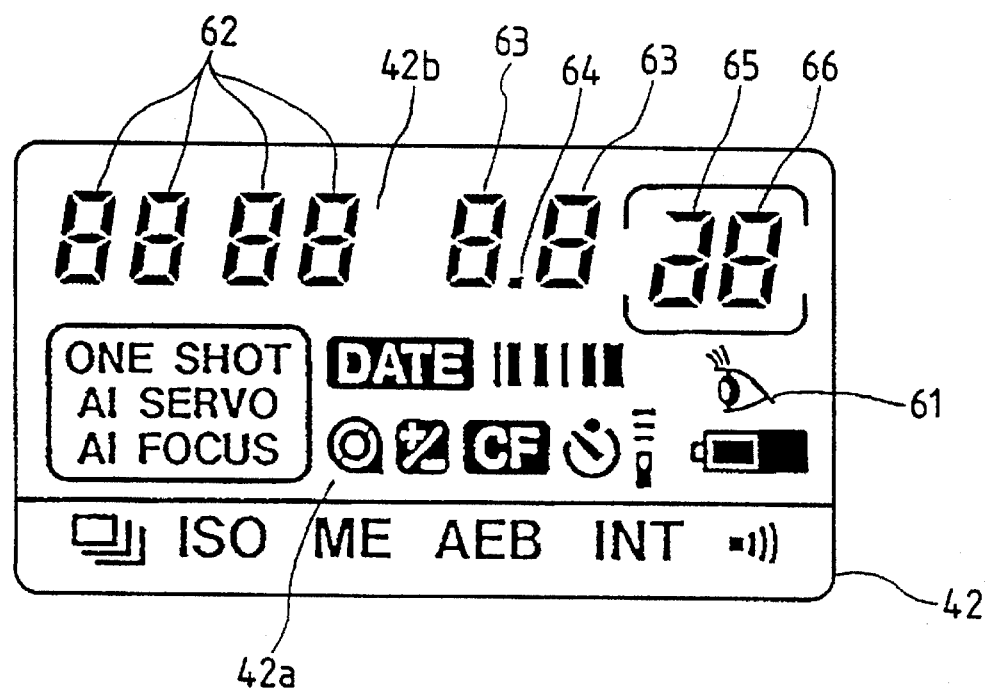
FIGS. 7A and 7B are views showing the state that the monitor LCD and the LCD in the finder are all illuminated according to the present embodiment.
Figure 7B:
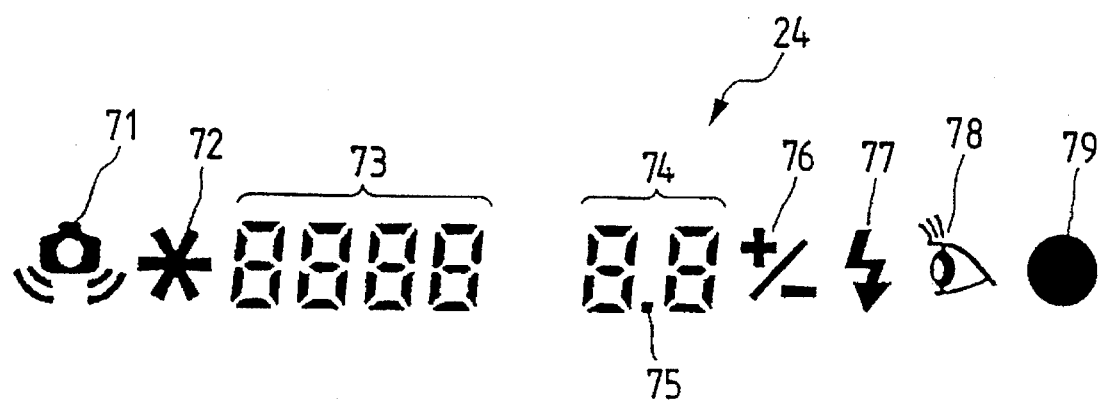

FIGS. 7A and 7B are views showing the contents of the entire segmental representations of the monitor LCD 42 and finder LCD 24 shown in FIG. 2A and FIG. 3.

In FIG. 7A, in the fixed segmental display unit 42a, the visual axis input mode indication 61 is provided by the use of the visual axis information in order to indicate the control of the AF operation of the camera, the selection of the photographing mode, and other photographing operations by the application of the visual axis detection in addition to the known photographing mode display. The seven-segmental display unit 42b for the variable numerical representation comprises a four-digit seven-segmental portion 62 which displays the shutter seconds, two-digit seven-segmental portion 63 and a decimal point 64 which display the diaphragm values, and a limited numerical value indication segmental portion 65 and one digit seven-segmental portion 66 which display the film numbers. The description of the other parts will be omitted.

In FIG. 7B, a reference numeral 71 designates a camera-shake warning mark; 72, an AE locking mark; 73, 74, and 75, the same indication segmental portions as the foregoing shutter second and diaphragm indications; 76, an exposure correction setting mark; 77, a strobe charge completion mark; 78, a visual axis input mark which indicates the input state of the visual axis; and 79, the in-focus mark which indicates the in-focus state of the photographing lens 1.

Figure 8B:
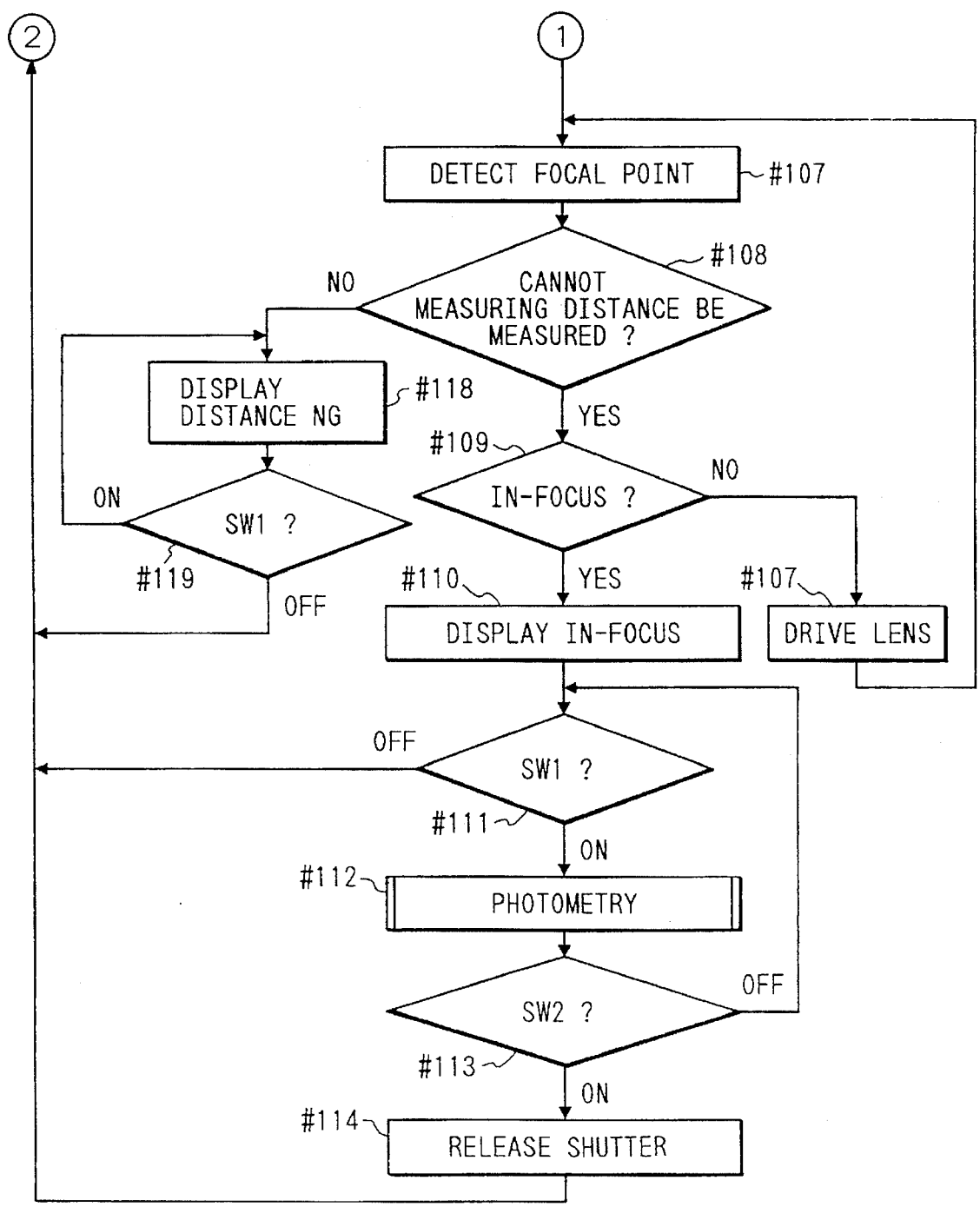
FIG. 8 is comprised of FIG. 8A and FIG. 8B illustrating flowcharts showing a series of operations of the single-lens reflex camera shown in FIG. 1.

Now, the operation of the camera having the visual detection function will be described using FIGS. 9A to 9C and FIGS. 10A and 10B as well as according to a flowchart shown in FIGS. 8A and 8B.

When the camera is set in a given photographing mode from its inoperative state by rotating the mode dial 44 (in the present embodiment, the description will be made on the basis of a case that the shutter preference mode AE has been set), the power source of the camera is turned on (step 100), and then, the variables used for the visual axis detection other than the calibration data of the visual axis stored in the EEPROM 100a of the CPU 100 are reset (step 101).

Then, the camera is in the standby state until the switch SW1 is turned on when the release button 41 is depressed (step 102). When the signal input circuit 104 detects that the release button 41 is depressed so that the switch SW1 is turned on, the CPU 100 confirms through the visual axis detection circuit 101 the calibration data which will be used for the visual axis detection (step 103).

At this juncture, if the calibration data of the calibration data number which has been confirmed remains as its initial value and is not modified, or the visual axis prohibition mode is set, no visual axis detection will be executed. In other words, no visual axis information is used, but a specific distance measuring point is selected by the application of the distance measuring point automatic selection subroutine (step 116). The automatic focus detection circuit 103 executes the focus detection operation at this distance measuring point (step 107).

Such as this, there are provided the visual axis prohibition mode whereby to perform the selection of the distance measuring point without using any visual axis information, and the visual axis mode whereby to perform the selection of the distance measuring point by use of visual axis information. It is possible for the photographer to select them arbitrarily depending on whether the visual axis prohibition mode is set.

Figure 11:
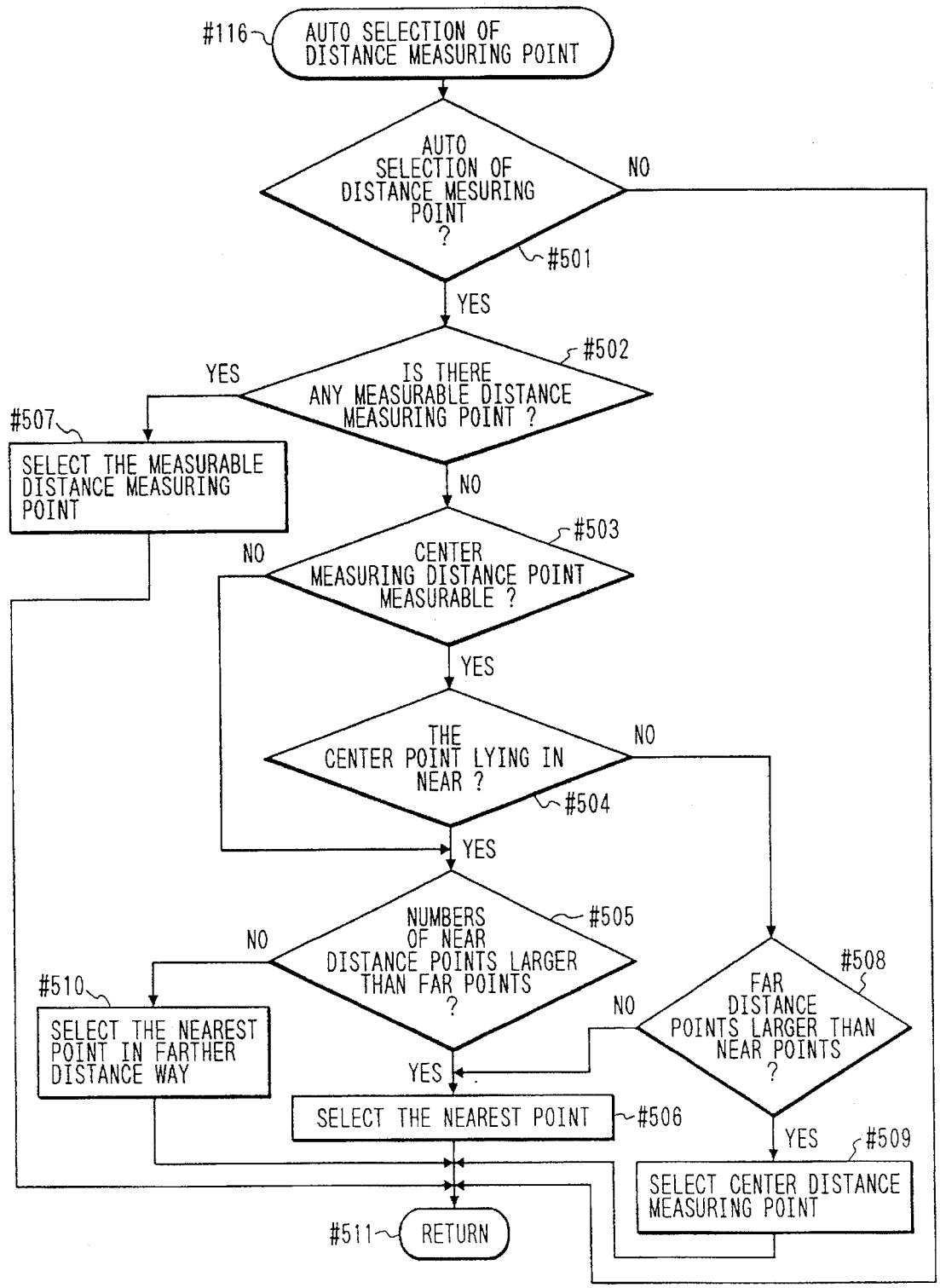
FIG. 11 is a flowchart showing the operation of the distance measuring point automatic selection also shown in FIG. 8A and FIG. 8B.

In this respect, several methods can be considered for an algorithm for selecting the distance measuring points, but it is effective to adopt a near point preference algorithm in which a weight is added to the central distance measuring point. Here, such an example is shown in FIG. 11 and the description will be made later.

Also, when it is confirmed that the calibration data corresponding to the calibration data number are set at a given value, and that such data are inputted by the photographer, the visual axis detection circuit 101 executes the visual axis detection in accordance with the calibration data thus confirmed (step 104).

In the present embodiment, since the mode dial 44 is assumed to be in the position for the shutter preference AE, the visual axis position of the photographer is calculated by the visual axis detection subroutine (step 104). Then, the visual axis detected by the visual axis detection circuit 101 is transformed into the target point coordinates on the imaging plate 7. The CPU 100 selects the distance measuring point adjacent to the target point coordinates, and transmits a signal to the LED driving circuit 106 to cause the foregoing distance measuring point mark to blink for display using the superimpose LED 21 (step 105). Also, the CPU 100 drives the LCD driving circuit 105 to cause the visual axis input mark 78 to be illuminated in the finder LCD 24, so that the photographer can confirm by means of the display at 207 outside the finder field that the camera currently engages in the visual detection execution (refer to FIG. 9A). Also, the shutter second which is currently set is displayed on the seven-segmental portion 73. (In the present embodiment, the shutter preference AE of ¹/₂₅₀ second is illustrated.)

Figure 9A:
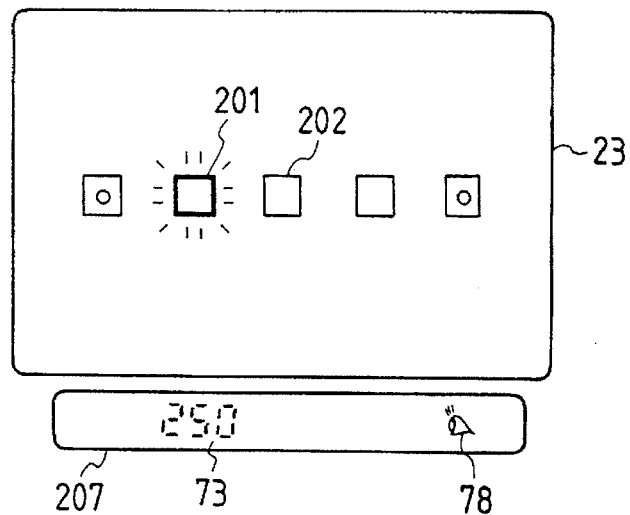
FIGS. 9A, 9B, and 9C are views showing the display of the LCD in the finder, which are provided to stand by the description of the operation shown in FIG. 8A and FIG. 8B.
Figure 9B:
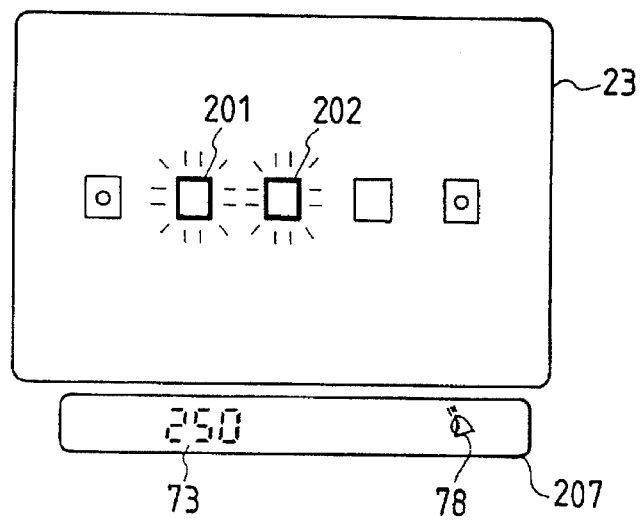
Figure 9C:
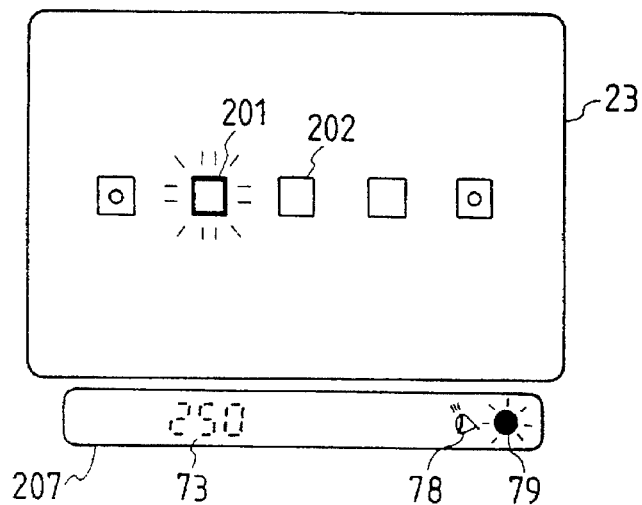

FIGS. 9A and 9C show a state that the distance measuring point mark 201 has been selected as an example. Also, at this juncture, if the reliability is low for the target point coordinates detected by the visual axis detection circuit 101, the CPU 100 transmits a signal so that the number of the distance measuring point to be selected should be changed in accordance with the degree of such reliability.

FIG. 9B shows a state that the reliability of the target point is lower than that shown in FIG. 9A, so that the distance measuring point marks 201 and 202 are selected.

If the photographer, observing the display of the distance measuring point selected by the visual axis, recognizes that such distance measuring point is incorrect and retracts his hand from the release button 41 to turn off the switch SW1 (step 106), the camera will be on standby until the switch SW1 is turned on (step 102).

In this way, by blinking the distance measuring point mark in the finder field for display it, the photographer is able to know that the distance measuring point has been selected using the visual axis information. Hence, the photographer can confirm whether the selection has been made as intended.

Also, if the photographer continues turning on the switch SW1 while observing the display of the distance measuring point selected by the visual axis (step 106), the automatic focus detection circuit 103 executes the focus detection at one or more distance measuring points using the visual axis information thus detected (step 107).

Then, whether the selected distance measuring point is measurable or not is determined (step 108). If not measurable, the CPU 100 transmits a signal to the LCD driving circuit 105 to cause the in-focus mark 79 to blink in the finder LCD 24 as shown in FIG. 9C and gives a warning to the photographer that the distance measuring is NG (disabled) (step 118) This action will continue until the switch SW1 is turned off.

Also, if measurable but the focus adjustment of the distance measuring point selected by a given algorithm has not brought about the in-focus state (step 109), the CPU 100 transmits a signal to the lens focus adjustment circuit 110 to drive the photographing lens 1 for a given amount (step 117). After having driven the lens, the automatic focus detection circuit 103 executes the focus detection again (step 107) and determines whether the photographing lens 1 is in the in-focus state (step 109).

Figure 10A:
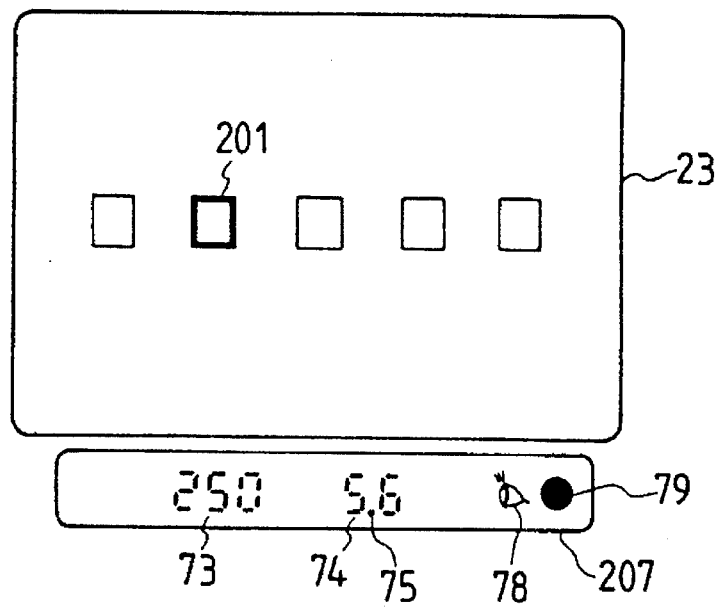
FIGS. 10A and 10B are views showing the display of the LCD in the finder also to stand by the operational description in FIG. 8A and FIG. 8B.

If the photographing lens 1 is in the in-focus state at the given distance measuring point, the CPU 100 transmits a signal to the LCD driving circuit 105 for the illumination of the in-focus mark 79 in the finder LCD 24 as shown in FIG. 10A, and at the same time, transmits the signal to the LED driving circuit 106 to execute the in-focus indication at the in-focus distance measuring point 201 (step 110).

At this juncture, the blinking display of the distance measuring point selected by the foregoing visual axis is turned off, but in most cases, the distance measuring point which is displayed as in-focus and the distance measuring point selected by the foregoing visual axis agree with each other. Thus, the in-focus distance measuring point is set in the illuminated condition in order to enable the photographer to know that the point is in the in-focus state. When the photographer observes the displayed in-focus point in the finder, but does not consider that the measuring point is right, he will retract his hand from the release button 41 to turn off the switch SW1 (step 111). Then, the camera will be on standby until the switch SW1 is turned on (step 102).

Also, if the photographer allows the switch SW1 to be turned on continuously after having observed the distance measuring point thus displayed (step 111), the CPU 100 transmits a signal to the photometric circuit 102 to execute the required photometry (step 112). At this juncture, an exposure value is calculated by adding a weight to the photometric regions 210 to 213 including the in-focus distance measuring point.

In the case of the present embodiment, the known photometric operation is executed, in which a weight is added to the photometric region 210 including the distance measuring point 201. An aperture value (F5.6) is displayed as the result of this calculation by use of the seven-segmental unit 74 and decimal point 75 (refer to FIG. 10A).

Further, whether the release button 41 is depressed and the switch SW2 is turned on is determined (step 113). If the switch SW2 is in the off state, the current state of the switch SW1 is again confirmed (step 111). As a result, if the switch SW2 is turned on, the CPU 100 transmits a signal to the shutter control circuit 108, motor control circuit 109, and diaphragm driving circuit 111, respectively.

In other words, the motor M2 is energized at first to bring the main mirror up. Then, after the diaphragm having been stopped down, the magnet MG1 is charged to release the first blind of the shutter 4. The aperture value of the diaphragm 31 and the shutter speed of the shutter 4 are determined on the basis of the exposure value and the sensitivity of the film 5 detected by the foregoing photometric circuit 102. After the elapse of a given shutter second (¹/₂₅₀ second), the magnet MG2 is charged to close the second shutter blind of the shutter 4. When the exposure of the film 5 is completed, the motor M2 is again energized to bring the mirror down and charge the shutter, and at the same time, to energize the motor M1 for feeding the next frame of the film, hence completing a series of the shutter release sequential operation (step 114). Then, the camera will be on standby until the switch SW1 is again turned on (step 102).

Also, if a mode change takes place by means of the mode dial 44 during a series of the operation other than the shutter release operation for the camera as shown in FIG. 8A (step 114), and the signal input circuit 104 detects that the mode is currently set at the visual axis calibration, the CPU 100 suspends the camera operation temporarily and transmits a signal to the visual axis detection circuit 101 so that the visual axis calibration is set operable (step 115). The method of the visual axis calibration will be described later.

Now, in conjunction with FIG. 11, the description will be made of the distance measuring point automatic selection subroutine to be executed in the above-mentioned step 116.

This subroutine is executed in the visual axis prohibition mode, that is, the case where no visual axis input mode is set.

The distance measuring point is determined on the basis of the defocus amount of each distance measuring point and the information regarding the absolute distance.

At first, whether there is any measurable point among the five distance measuring points or not is determined (step 501). If not measurable at any one of the points, the process will return to the main routine (step 511). A measurable point is available, and if it is only one (step 502), such one point is defined as the distance measuring point (step 507). If two or more measurable points exist, the process will proceed to the next step, and then, it is determined whether there is a central distance measuring point available (step 503) or the available central point is the near distance (20 times or less the focal length, for example) (step 504).

Here, if the central distance measuring point is measurable and a near distance or the central distance measuring point is not measurable, the process will proceed to step 505. In the step 505, if the number of the near distance measuring points is greater than the number of the far distance measuring points, the major object is judged to be considerably closer to the photographer side, and the nearest distance measuring point is selected (step 506). Also, if the number of the near distance measuring points is small, the major object is judged to be on the farther distance side, and the nearest one in the farther distance measuring points is selected in consideration of the field depth (step 510).

In the step 504, if the central measuring point is a farther distance, the process will proceed to step 508. Here, if the number of the farther distance measuring points is greater than the number of the near distance measuring points, the major object is Judged to be in the farther distance side including the central distance measuring point, and the central distance measuring point is selected (step 509). Also, if the number of the farther distance measuring points is small, the nearest distance measuring point is selected in the same way as described above (step 506).

As set forth above, if measurable points are available, one of them is automatically selected, and the process will return to the main routine (step 511) to execute the focus detection operation again by the application of this distance measuring point (step 107).

Figure 10B:
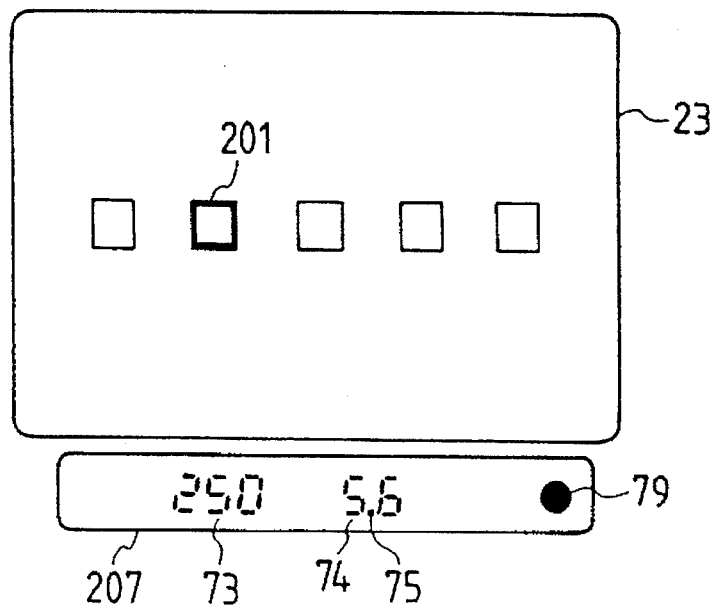

In this respect, the in-focus display where the distance measuring point is selected by use of the foregoing visual axis information, which is the same as in FIG. 10A, is such that the distance measuring point 201 and in-focus mark 79 are illuminated as shown in FIG. 10B, but the visual input mark 78 is in the off-state as a matter of course.

Now, in conjunction with FIG. 12 and FIG. 13, the description will be made of the visual axis detection subroutine to be executed in the above-mentioned step 104.

As described earlier, when the visual axis detection circuit 101 receives a signal from the CPU 100, a visual axis detection will be executed (step 104). The visual detection circuit 101 determines whether the current visual axis detection is in the photographing mode or in the visual axis calibration mode (step 201). Simultaneously, the visual axis detection circuit 101 recognizes the calibration data number at which the camera is set, which will be described later.

In the visual axis detecting in the photographing mode, the visual axis detection circuit 101 detects the camera position at first through the signal input circuit 104 (step 202). The signal input circuit 104 determines whether the camera position is horizontal or vertical by processing the output signals from the mercury switch 27 (SW-ANG) or determines whether the release button 41 is in the ceiling direction or in the ground direction, for example, if the camera is in the vertical position. Then, in continuation, this circuit receives the brightness information of the photographing area from the photometric circuit 102 through the CPU 100 (step 203).

Then, the infrared light emitting diodes (hereinafter abbreviated as IRED) 13a to 13f are selected (step 204) on the basis of the camera position information already detected and the photographer's spectacle information included in the calibration data. In other words, if the camera position is horizontal and the photographer uses no spectacles, the IRED 13a and 13b near the finder optical axis shown in FIG. 2B are selected.

Also, if the camera position is horizontal and the photographer uses his spectacles, the IRED 13c and 13d which are farther away from the finder optical axis are selected. At this juncture, a part of the illumination light reflected from the photographer's spectacles arrives at the area other than the given region on the image sensor 14 to the eyeball image is projected, thus, creating no hindrance in analyzing the eyeball image.

Further, if the camera position is vertical, the combination of IREDs, that is, either 13a and 13e or 13b and 13f, which illuminates the eyeball of the photographer from below is selected.

Then, the accumulation time of the image sensor 14 (hereinafter referred to as CCD-EYE) and the illuminating power of the IRED are set on the basis of the foregoing photometric information and photographer's spectacle information (step 205). The accumulation time of the CCD-EYE and the illuminating power of the IRED may be set on the bases of the value determined by the contrast of the eyeball images and others which are obtained in the last visual axis detection.

When the accumulation time of the CCD-EYE and the illuminating power of the IRED are set, the CPU 100 illuminate the IRED by a given power through the IRED driving circuit 107, and at the same time, the visual axis detection circuit 101 starts accumulating the CCD-EYE (step 206)

Also, the CCD-EYE completes the accumulation in accordance with the accumulation time set previously. With this, the IRED is turned off. Then, unless the process is in the visual axis calibration mode (step 207), the read-out area of the CCD-EYE is established (step 208).

The read-out area of the CCD-EYE is established by referring to the read-out area of the CCD-EYE at the time of executing the last visual axis detection with the exception of the initial area readily available subsequent to the power source of the camera main body having been turned on, but if the camera position changes, the inclusion of the spectacles changes, or the like, the read-out area of the CCD-EYE will be set to cover the entire areas.

When the read-out area of the CCD-EYE has been set, the CCD-EYE executes its reading (step 209). At this juncture, an empty reading is executed in the areas other than the read-out area. In practice, the reading skips over such areas. The output of the image read by the CCD-EYE is A/D converted by the visual axis detection circuit 101 and then stored in the CPU 100. Thus, the CPU 100 operates the extraction of each of the characteristic points of the eyeball images (step 210).

In other words, in the CPU 100, the positions (xd' and yd'), (xe' and ye') of the Purkinje images, the virtual images of a pair of the IREDs which are used to illuminate the eyeball 15, are detected. Since the Purkinje images appear as the luminance having a great luminous intensity, a given threshold value is set for the luminous intensity. It is then possible to detect them by regarding the luminance the luminous intensity of which exceeds this threshold value as the Purkinje images.

Also, when the central positions (xc' and yc') of the pupil 19 is obtained, plural boundary points between the pupil 19 and iris 17 are detected, thus calculating them by executing the least square approximation of a circle based upon each of the boundary points. At this juncture, the pupil diameter rp is also calculated. Also, by the application of the positions of the Purkinje images, the interval between them is calculated.

The CPU 100 detects the contrast of the eyeball images while analyzing them, and based on the degree of such contrast, the accumulating time of the CCD-EYE is set again.

Also, by the positions of the Purkinje images and pupil 19, the read-out area of the CCD-EYE is defined. At this juncture, the read-out area of the CCD-EYE includes the detected pupil 19 to make it possible to set the area so that the entire pupil can be detected even when the positions of the foregoing pupil 19 vary within a given amount. Then, its size must be smaller than that of the iris as a matter of course.

The read out area of the CCD-EYE is defined in a rectangular. Then, the coordinates at the symmetrical two points of this rectangular are stored in the visual axis detection circuit 101 as the read out area of the CCD-EYE. Further, by the contrast of the eyeball images, the size of the pupil 19, and others, the reliability of the positions of the detected Purkinje images and the pupil center is determined.

When the analysis of the eyeball images are completed, it is determined in accordance with the combination of the interval between the calculated Purkinje images and the illuminated IRED whether the spectacle information contained in the calibration data is correct or not by use of the visual axis detection circuit 101 which dually serves as confirming means of the calibration data (step 211). This counteracts the event that a photographer uses or does not use his spectacles depending on the situations.

In other words, if the 13c and 13d of the IREDs shown in FIG. 2B are illuminated while a photographer's spectacle information in the calibration data is set to indicate that he uses his spectacles, for example, it is determined that the spectacle information is correct provided that the interval between the Purkinje images is greater than a given distance because this indicates that the photographer uses his spectacles.

On the contrary, if the interval between the Purkinje images is smaller than a given distance, it is interpreted that the photographer does not use any spectacles or he uses contact lenses. Then, the spectacle information is considered incorrect. When the spectacle information is found to be incorrect (step 211), the visual axis detection circuit 101 modifies the spectacle information (step 217), and selects the IRED again (step 204) for the execution of the visual axis detection. However, when a spectacle information is modified, any spectacle information stored in the EEPROM of the CPU 100 is not changed.

Also, when the spectacle information is found to be correct (step 211), the distance between the eyepiece lens 11 of the camera and the eyeball 15 of the photographer is calculated by the interval between the Purkinje images. Further, the image formation magnification β of the projected eyeball image on the CCD-EYE is calculated by the distance between the eyepiece lens 11 and the photographer's eyeball 15 (step 212). With the values calculated above, the rotation angle θ of the optical axis of the eyeball 15 can be expressed (step 213) by modifying the foregoing equation (3) as follows:

$$\theta x \cong ARCSIN\ \{(xc'-(xp'+\delta x))/\beta/L_{oc}\} \tag{47}$$

$$\theta y \cong ARCSIN\ \{(yc'-(yp'+\delta y))/\beta/L_{oc}\} \tag{48}$$

where $$xp' \cong (xd'+xe')/2$$

$$yp' \cong (yd'+ye')/2$$

where δx, δy are the items required to correct the center positions of the two Purkinje images.

When the rotation angle of the photographer's eyeball 15 is obtained, the positions (x and y) of the visual axis on the imaging plate 7 can be obtained by the foregoing equations (6) and (14).

Also, depending on the reliability of the visual axis calibration data, the foregoing equations (13) to (17) are used to modify the reliability of the calculated coordinates of the visual axis. When the coordinates of the visual axis on the imaging plate 7 are obtained, a flag (n=1) is set to indicate that the visual axis detection has been executed once (step 215). Then, the process will return to the main routine (step 218).

Figure 12:
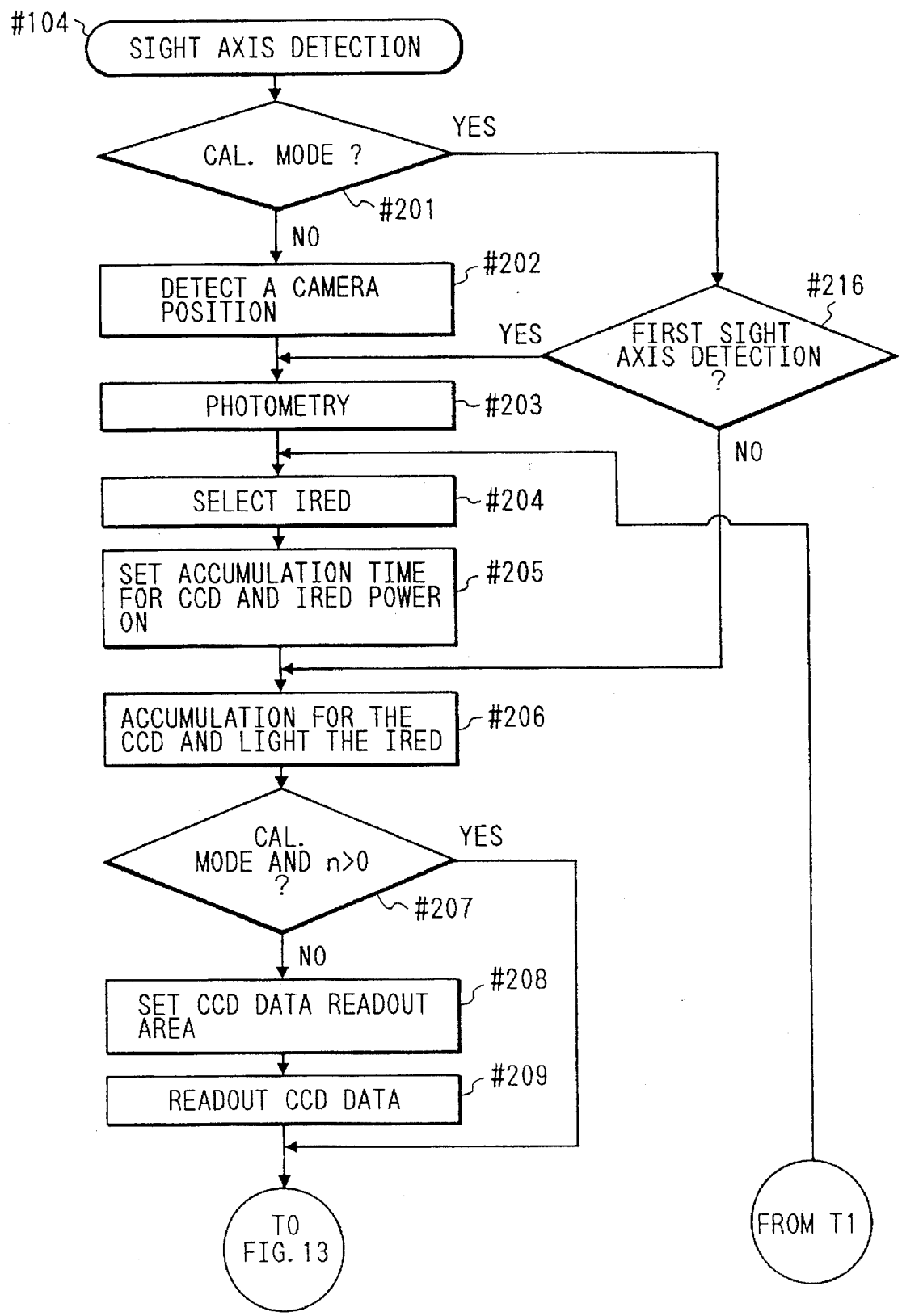
FIG. 12 is a flowchart partially showing the visual axis detection operation shown in FIGS. 8A and 8B.
Figure 13:
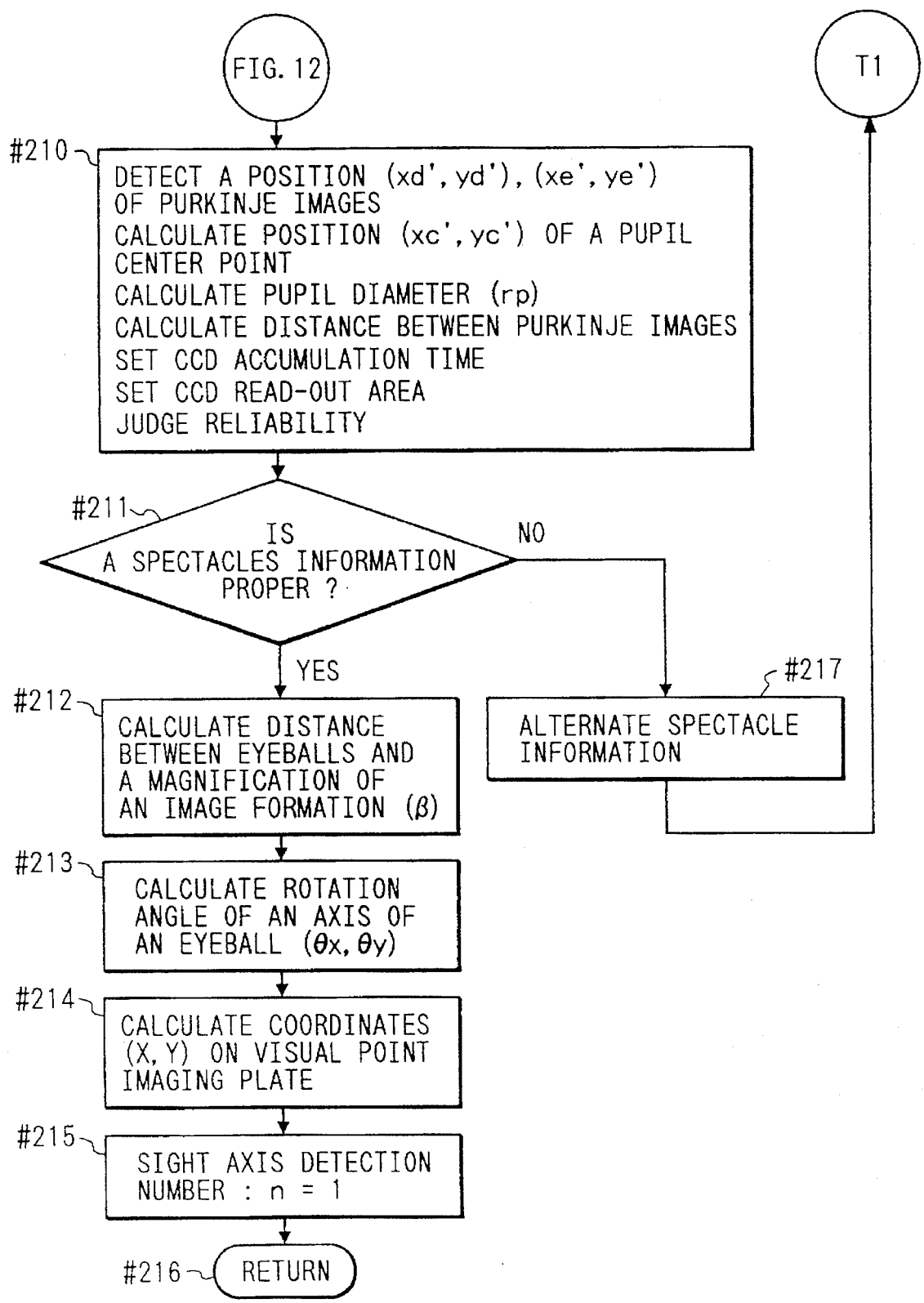
FIG. 13 is a flowchart showing a continuation of the operation shown in FIG. 12.

Also, the flowchart for the visual axis detection shown in FIG. 12 and FIG. 13 is effective in the visual axis calibration mode. In other words, if it is determined in the step 201 that the visual axis detection is of the calibration mode, whether the current visual axis detection is the first visual axis detection in the calibration mode will be determined in the next step (step 216).

If the current visual axis detection is found to be the first one to be executed in the calibration mode, the circumferential brightness is measured in order to set the accumulation time of the CCD-EYE and the illumination power of the IRED (step 203). Thereafter, the operation will be the same as described earlier.

Also, if the current visual detection is found to be the one in the calibration mode for the second time or more (step 216), the values obtained in the last detection are adopted for the CCD-EYE accumulation time and IRED illumination power. Then, while starting the accumulation of the CCD-EYE, the IRED is immediately turned on (step 206).

Also, when the number of the visual axis detection is of the second time or more in the visual axis calibration mode (step 207), the read-out area to be used for the CCD-EYE is the same as the one used last time. Thus, while the accumulation for the CCD-EYE is terminated, the read-out of the CCD-EYE is immediately executed (step 209). Thereafter, the operation will be the same as described earlier.

Here, in the visual axis detection flowchart shown in FIG. 12 and FIG. 13, when the process returns to the main routine in a case of the usual visual axis detection, the variables are the coordinates (x and y) on the visual axis imaging plate, but in a case of the visual axis detection in the visual axis calibration mode, the variables are the rotation angles (θx and θy) of the optical axis of the photographer's eyeball. The other variables such as the reliability of the detection result, CCD-EYE accumulation time, CCD-EYE read-out area are common to both cases.

Also, in the present embodiment, the photometric information detected by the photometric sensor 10 of the camera is utilized for setting the CCD-EYE accumulation time and IRED illumination power, but it may be possible to provide anew a detection means to measure the brightness of the frontal face of the photographer in the vicinity of the eyepiece lens 11. The values of such a detection means can be effectively utilized for the purpose, too.

Now, in conjunction with FIG. 14, FIG. 15, and FIG. 16, the description will be made of the calibration subroutine to be executed in step 115 in FIG. 8A and FIG. 8B, while referring to the displayed conditions of the finder LCD 24 and monitor LCD 42 at the time of the visual axis calibration shown in FIG. 17A to FIG. 23B.

The visual axis calibration has hitherto been executed by detecting the visual axis of a photographer when he observes two or more targets attentively, but in the present embodiment, the visual axis calibration is executed by detecting the photographer's visual axis when he fixes his sight at two targets (dot marks) 205 and 206 arranged in the finder field. As the result of this detection, the visual axis calibration data corresponding to the pupil diameter rp will be calculated.

Hereinafter, in conjunction with FIGS. 8A and 8B, FIGS. 14 to 16, and FIGS. 17A to 23B, this operation will be described in detail.

When the photographer rotates the mode dial 44 to match the "CAL" position 44d with the indicator 55, the visual axis calibration mode is set up. Then, the signal input circuit 104 transmits a signal to the LCD driving circuit 105 through the CPU 100, hence enabling the monitor LCD 42 to indicate that the operation is ready for either one of the calibration modes which will be described later.

Also, the CPU 100 resets the variables other than the calibration data stored in the EEPROM 100a (step 301).

FIG. 24 shows the kinds and initial values of the calibration data stored in the EEPROM 100a of the CPU 100. The data actually stored in the EEPROM 110a of the CPU 100 are those encircled by a bold line in FIG. 24, which represent the currently set calibration data number and the plural calibration data under the management of such number. Here, the calibration data number "zero" stands for the mode whereby to prohibit the visual axis detection.

Also, the arrangement is so made such that each of the above-mentioned visual axis calibration data is stored in each of the addresses of the EEPROM 100a corresponding to the calibration data numbers "1" to "5". (Five data are stored in the present embodiment, but this is just for the description's sake. Data can be set in anyway depending on the capacity of the EEPROM 100a as a matter of course.)

The initial values of the calibration data are set so that the visual axis can be calculated in accordance with the standard eyeball parameters. Further, flags are provided to indicate whether the photographer uses his spectacles or not, and also, to indicate the reliability of the calibration data. The initial value of the flag for the indication of whether spectacles are used or not is set at "1" to indicate the presence of spectacles. The initial value of the flag for the indication of the reliability of the calibration data is set at "0" to indicate no reliability.

Figure 17A:
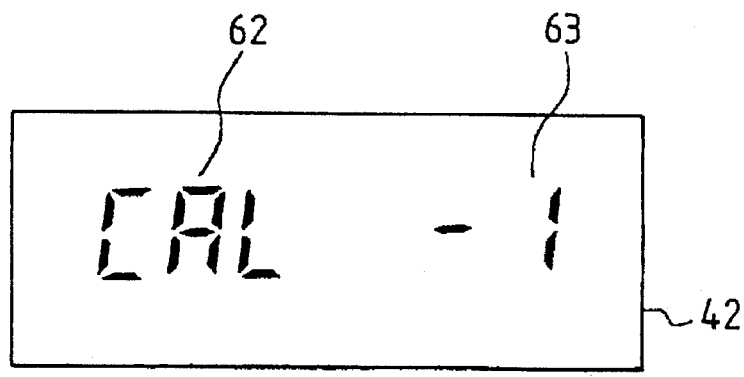
FIGS. 17A, 17B, and 17C are views showing the display of the monitor LCD at the time of setting the calibration numbers according to the present embodiment.

Also, in the monitor LCD 42, the currently set calibration mode is set as shown in FIG. 17A. For the calibration mode, there are the "ON" mode in which the calibration is operable, and the "OFF" mode in which no calibration is operable.

At first, in the "ON" mode, the calibration numbers "CAL1" to "CAL5" are prepared corresponding to the calibration data numbers "1" to "5". The display is made by means of the seven-segmental unit 62 which represents the shutter seconds and the seven-segmental unit 63 which represents the aperture values. The other fixed segmental display units are all turned off (in the present embodiment, the state of the data number "1" is represented, and only this display portion is shown in enlargement).

Figure 17B:
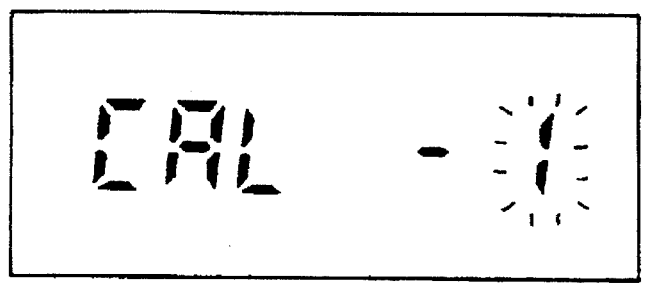
Figure 17C:
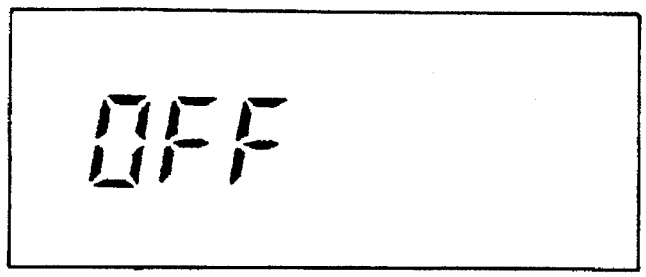

In this case, if the calibration data of the set calibration data number is its initial value, the calibration data number displayed on the monitor LCD 42 blinks (refer to FIG. 17B).

On the other hand, if the calibration which will be described later has already been executed for the set calibration number, so that the calibration data number having a value which differs from the initial value is present in the address on the EEPROM 100a corresponding to the calibration data number, it is so arranged that the calibration number displayed on the monitor LCD 42 is fully illuminated (refer to FIG. 17A).

As a result, the photographer can confirm whether each of the currently set calibration numbers has already its calibration data or not. Also, if the initial value of a calibration data number is set at "0", and no visual axis calibration is executed, it is so arranged that no input of visual axis information is made.

Now, in the "OFF" mode, the seven-segment 63 displays "OFF" (refer to FIG. 17C), and the calibration data number "zero" is always selected to set the visual axis prohibition mode. This can be effectively utilized in photographing situations given below.

1) The situation in which the visual axis detection is disabled due to an intensive light such as the sunlight which illuminates the photographer's eyeball or an extremely bright scene that the photographer watches such as snow-covered mountains or a sandy beach in a fine weather.
2) The situation in which the control cannot be made as intended by the photographer or becomes disabled due to the main object being located on the circumference of the imaging plane other than the distance measuring points, the background scene which the photographer watches for some time in order to set a composition, or the like.
3) The situation that may lead a malfunction such as an occasion where some other photographer is requested to take a commemorative picture, thus the visual axis detection position is erroneously taken because of the different calibration data. In this case, the visual axis detection should be prohibited, and then, the photographing mode should preferably be selected in order to control the photographing functions without using the visual axis information.

Figure 14:
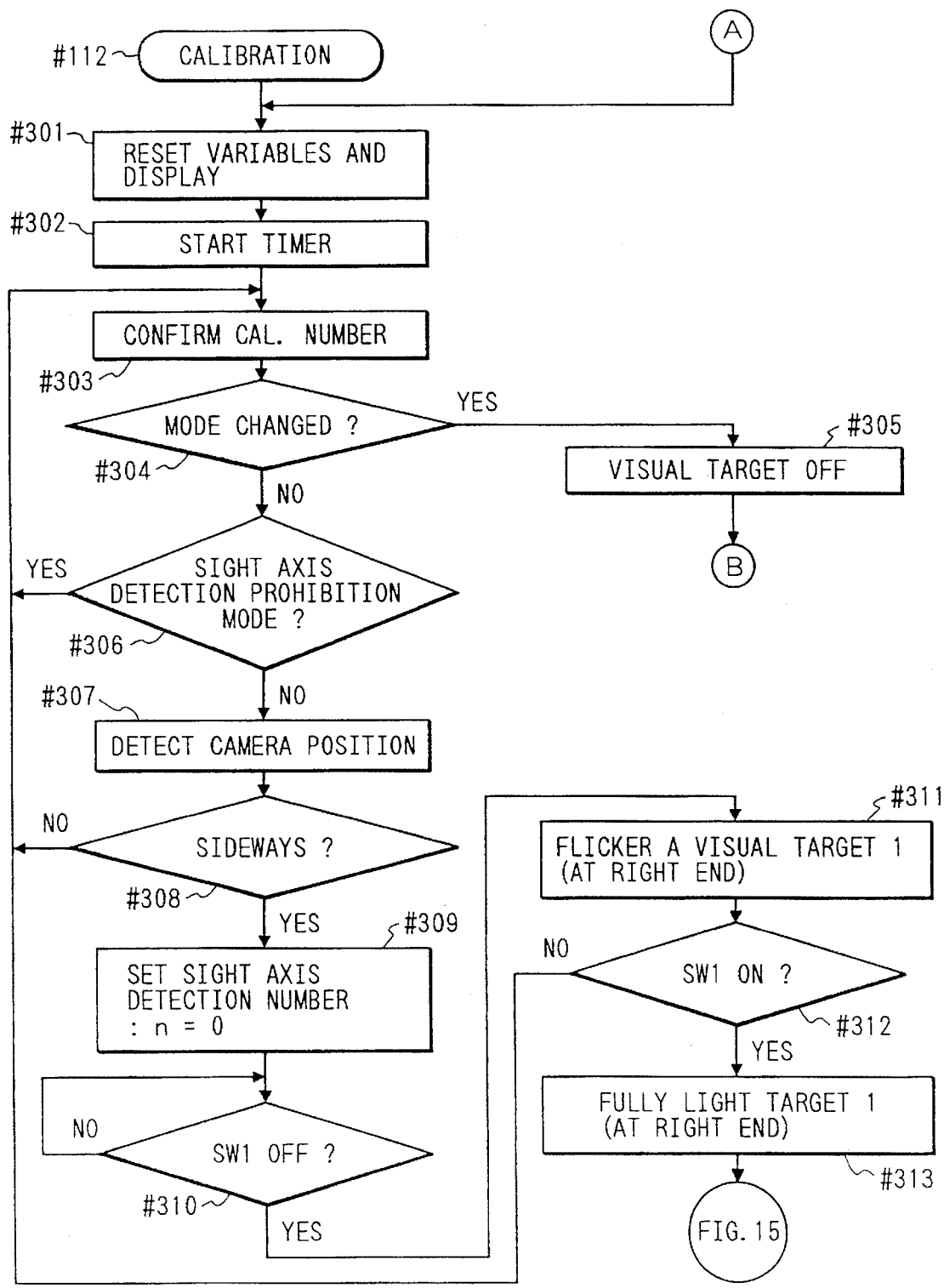
FIG. 14 is a flowchart partially showing the operation of the single-lens reflex camera shown in FIG. 1 when the calibration is executed.

Now, reverting to FIG. 14, the timer provided for the CPU 100 is started. Then, the visual axis calibration begins (step 302). However, if no operation is executed at all for the camera within a given time after the timer has started, the visual axis detection circuit 101 resets the currently set calibration data number at "0" and changes the current mode to the visual axis prohibition mode. Also, if the visual targets and others for the visual axis calibration are illuminated in the finder, these are all turned off.

Figure 18:
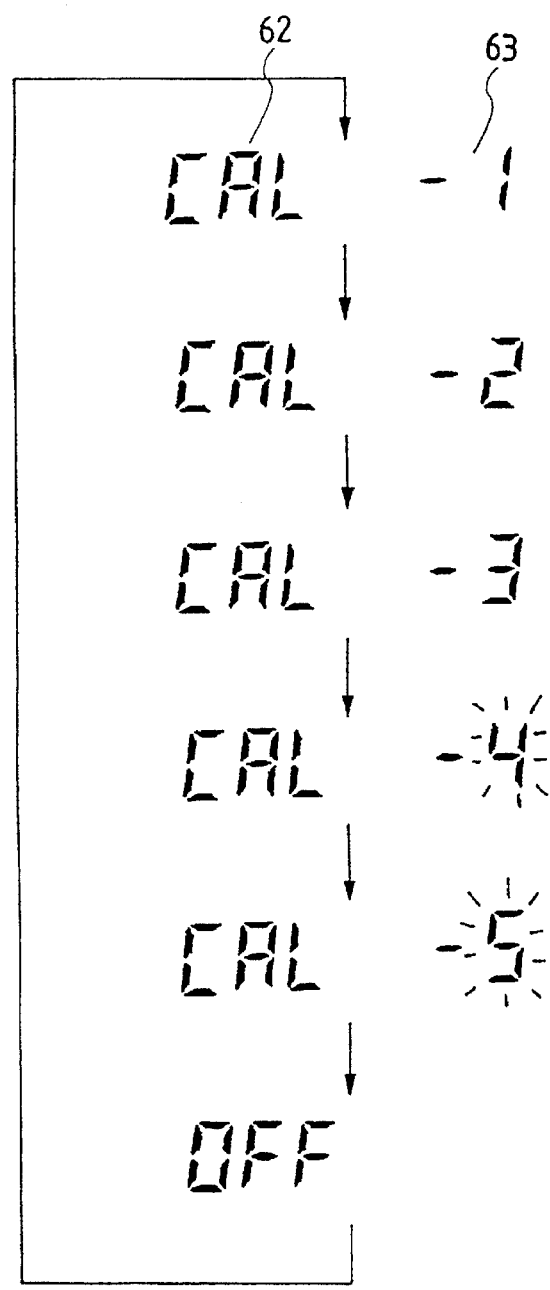
FIG. 18 is a view also showing the display of the monitor LCD at the time of setting the calibration numbers according to the present embodiment.

When the photographer rotates the electronic dial 45, the signal input circuit 104, having detected such rotation of the dial by the foregoing pulse signals, transmits a signal to the LCD driving circuit 105 through the CPU 100. As a result, the calibration number displayed on the monitor LCD 42 is changed in synchronism with the rotation of the electronic dial 45. FIG. 18 illustrates this state.

At first, as the electronic dial 45 is rotated clockwise, the display changes beginning at "CAL-1"→"CAL-2"→"CAL-3"→"CAL-4"→"CAL-5" in that order. Thus, the photographer can store the calibration data in either one of the five calibration numbers by the calibration operation which will be described later.

Then, in the state shown in FIG. 18, the calibration data have already been in the "CAL-1, CAL2, and CAL-3", while no data are in the "CAL-4 and CAL5" which still remain in representing the initial values.

Now, if the dial is further rotated one click in the clockwise direction, the display shows "OFF" to set the visual prohibition mode. With the rotation of further one click, the dial returns to the "CAL-1". In this way, the calibration numbers are displayed cyclically. If the dial is rotated in the counterclockwise direction, the display appears in the direction just opposite to the one shown in FIG. 18.

When the photographer selects a desired calibration number while observing the calibration numbers being displayed on the monitor LCD 42, the visual axis detection circuit 101 confirms the calibration data number corresponding to it through the signal input circuit 104 (step 303). The calibration data number thus confirmed is stored in the EEPROM 110a of the CPU 100.

However, unless the confirmed calibration data number has been changed, there is no execution of the storage of the calibration data number to the EEPROM 100a of the CPU 100.

Then, in continuation, the visual axis detection circuit 101 confirms the photographing mode through the signal input circuit 104 (step 304). If it is confirmed that the photographer has rotated the mode dial 44 to switch the mode to a photographing mode other than the visual axis calibration mode (step 304), the process will return to the main routine, that is, the photographing operation of the camera (step 336), after turning off the blinking targets of the visual axis calibration, if any (step 305).

Then, if the mode dial 44 is switched to another photographing mode (shutter preference AE) in the state that the calibration number "CAL-1 to CAL-5" are still displayed, the visual axis detection is executed using the data of the calibration number, thus executing the photographing operation using the foregoing visual axis information.

Figure 19:
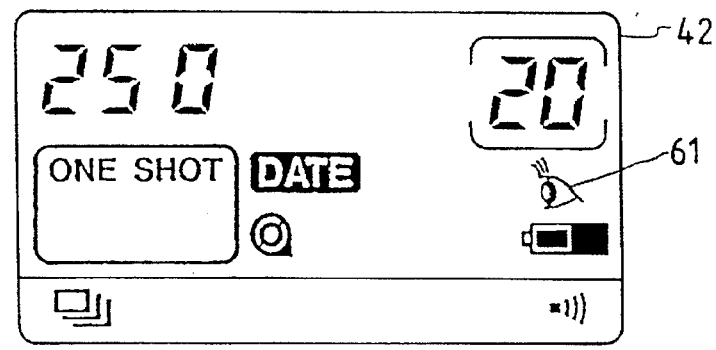
FIG. 19 is a view showing the display of the LCD in the finder in order to stand by the descriptions of the operation in FIG. 14 to FIG. 16.
Figure 20A:
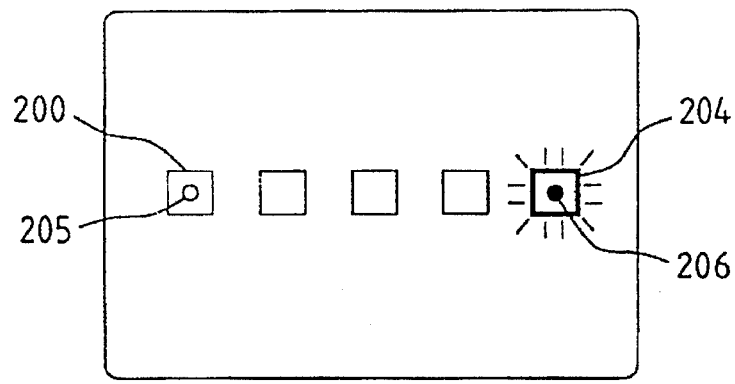
FIGS. 20A and 20B are also views showing the display of the LCD in the finder in order to stand by the descriptions of the operations in FIG. 14 to FIG. 16.
Figure 20B:
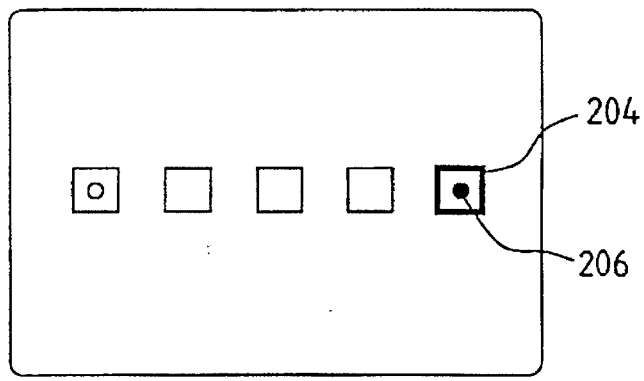
Figure 21A:
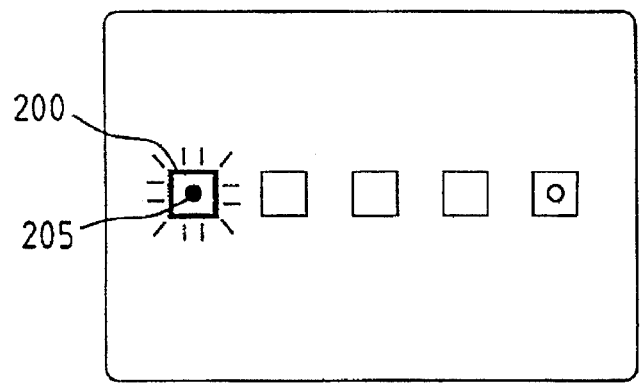
FIGS. 21A and 21B are also views showing the display of the LCD in the finder in order to stand by the descriptions of the operations in FIG. 14 to FIG. 16.
Figure 21B:
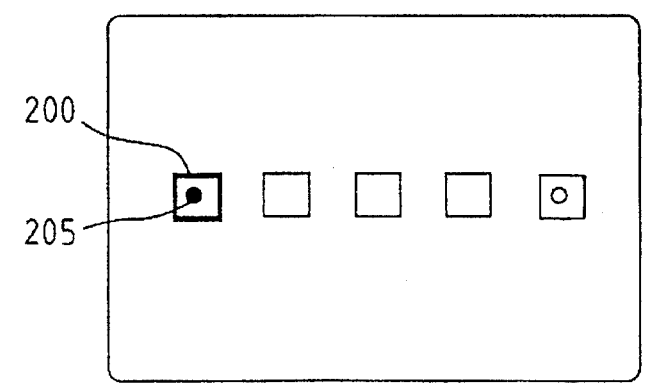

FIG. 19 illustrates the state of the monitor LCD 42 at this juncture. In addition to the usual display of the photographing mode, the visual axis input mode display 61 is illuminated to enable the photographer to know that the current mode is the visual axis input mode which controls the photographing operation on the basis of the visual axis information.

Here, if the mode dial 44 is rotated to match the "CAL" position 44d with the indicator 55, the calibration number used for the foregoing visual axis detection is displayed. Then, the calibration operation starts. However, if the photographer does not operate the camera at all within a given time or when the same calibration data are collected, no calibration data in the EEPROM 100a will change.

When it is confirmed that the mode is still set for the visual axis calibration (step 304), the calibration number set by the electronic dial 45 is reconfirmed (step 306).

At this juncture, if the selected calibration data number is "0" and thus, the visual axis prohibition mode is set, the calibration data number is again stored in the EEPROM 100a of the CPU 100 (step 303). If the visual axis prohibition is selected in the calibration mode, the camera will be on standby until it is changed by the mode dial 44 to the photographing mode other than the visual axis calibration mode.

In other words, it is so arranged that if the mode dial 44 is switched while the "OFF" is displayed, a photographing operation is executed without any operation of the visual axis detection. In the monitor LCD 42, the visual axis input mode display 61 is not illuminated, either.

If the calibration data number is set at the value other than "zero" (step 306), the CPU 100 continuously detects the camera position (step 307). Processing the output signal from the mercury switch 27, the signal input circuit 104 determines whether the camera is in the horizontal position (sideways) or in the vertical position, or the release button 41 is in the sky direction or ground direction if the camera is in the vertical position, for example.

Generally, since a camera is more often used sideways, the hardware structure for executing the visual axis calibration is arranged to make the calibration possible when the camera is positioned sideways. Therefore, the visual axis detection circuit 101 does not execute the visual axis calibration unless it is communicated from the CPU 100 that the camera is positioned sideways (step 308).

Figure 22A:
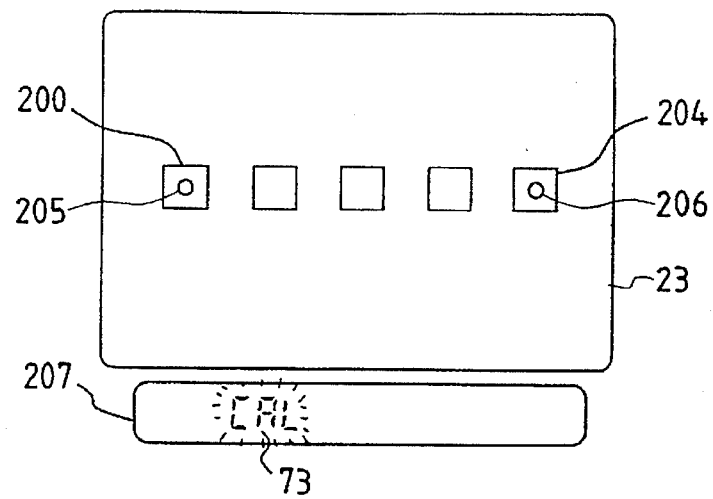
FIGS. 22A and 22B are also views showing the display of the LCD in the finder in order to stand by the descriptions of the operations in FIG. 14 to FIG. 16.

Also, the visual axis detection circuit 101 causes the "CAL" display to blink in the finder LCD 24 of the camera as shown in FIG. 22A in order to warn the photographer that no visual axis calibration is operable because the camera position is vertical. In this case, it may be possible to use a sound generator (not shown) for the provision of a warning sound.

On the other hand, if it is detected that the camera position is sideways (step 308), the visual axis detection circuit 101 sets the visual axis detection number n at "zero" (step 309). In this case, if the "CAL" display blinks in the finder LCD 24, the photographer should give his particular attention to it. The visual axis calibration is designed to begin its operation when the switch SW1 is turned on.

In order to prevent the camera side from starting any visual axis calibration before the photographer has prepared its execution, the visual axis detection circuit 101 confirms the current state of the switch SW1. If the switch SW1 is depressed by means of the release button 41 and is in the on state, this circuit will be on standby until the switch SW1 is turned off (step 310).

Having confirmed through the signal input circuit 104 that the switch SW1 is off (step 310), the visual axis detection circuit 101 transmits a signal to the LED driving circuit 106 to blink the visual targets for the visual axis calibration (step 311). The visual targets for the visual axis calibration partly serve as the distance measuring point marks in order to assist the photographer to smoothly execute the calibration operation as described below by following the guidance provided by a superimposed display. At first, the distance measuring point mark 204 and dot mark 206 on the right-side end are caused to blink (refer to FIG. 20A).

Here, the camera is on standby unless the signal is received to indicate that the switch SW1 is on (step 312). This signal serves as a trigger signal to allow the visual axis calibration to start. Also, giving attention to the target which has started blinking, the photographer depresses the release button 41 to turn on the switch SW1 (step 314). Then, the target 1 is illuminated fully (step 313) (refer to FIG. 20B), and the visual axis detection is executed (step 314). The operation of the visual axis detection is as described in accordance with the flowchart shown in FIG. 12.

Here, on the distance measuring point mark 204 on the right-side end and the distance measuring point mark 200 on the left-side end in FIG. 22A, the dot marks 205 and 206 are inscribed to show that the calibration is executed in the position indicated by these two points. It is so arranged that either of them can be illuminated, blinked, or turned off by means of the illumination of the superimpose LED. Also, the distance measuring point marks are to indicate the focus detection regions. It is therefore necessary to provide the representation of the area corresponding to such a region.

However, in order to execute the calibration with good precision, there is a need for the photographer to observe only one point as attentively as possible. These dot marks 205 and 206 are made smaller than the distance measuring point marks so that the photographer can easily observe the one point. The visual axis detection circuit 101 stores the rotation angles of the eyeball θx and θy, pupil diameter rp, and each of the reliability data, which are the variables provided by the subroutine of the visual axis detection (step 315).

Further, the visual axis detection number n is counted up (step 316). Since the photographer's visual axis varies slightly, it is effective to execute the visual axis detection plural times for one visual target for the utilization of the mean value thus obtained in order to achieve an exact data on the visual axis calibration. In the present embodiment, the number of the visual axis detections is set at ten times for one visual target. Unless the visual axis detection number n is ten times (step 317), the visual axis detection will continue (step 314).

When the visual axis detection number n is ten times, the visual axis detection for the visual target 1 (distance measuring point mark 204 and dot mark 206) is completed. Then, the visual detection circuit 101 makes an electronic sound several times using a sound generator (not shown) through the CPU 100, thus enabling the photographer to know that the visual axis detection for the visual target 1 has been completed. At the same time, the visual axis detection circuit 101 turns off the visual target 1 through the LED driving circuit 106 (step 318).

In continuation, the visual axis detection circuit 101 confirms through the signal input circuit 104 whether the switch SW1 is turned off or not (step 319). If the switch SW1 is still turned on, the process will be on standby until it is turned off. If the switch SW1 has been turned off, the visual target 2 on the left-side end (distance measuring point mark 200 and dot mark 205) begins blinking (step 320) (refer to FIG. 21A).

The visual axis detection circuit 101 reconfirms through the signal input circuit 104 whether the switch SW1 is turned on or not (step 321). If the switch SW1 is turned off, the process will be on standby until the switch SW1 is turned on. When the switch SW1 is turned on, the visual axis 2 is fully illuminated (refer to FIG. 21B) (step 322), thus executing the visual axis detection (step 323).

The visual axis detection circuit 101 stores the rotation angles θx and θy of the eyeball, pupil diameter rp, and the reliability of each data, which are the variables obtained from the subroutine of the visual axis detection (step 324). Further, the visual axis detection number n is counted up (step 325). Moreover, unless the visual axis detection number n is 20 times (step 326), the visual axis detection will continue (step 323). When the visual detection number n is 20 times, the visual axis detection for the visual target 2 is completed.

In order to assist the photographer to know that the visual axis detection for the target 2 has been completed, the visual axis detection circuit 101 causes the sound generator (not shown) to make the electronic sound several times through the CPU 100. At the same time, the visual axis detection circuit 101 turns off the visual target 2 through the LED driving circuit 106 (step 327).

Using the rotation angles θx and θy of the eyeball, and pupil diameter rp stored in the visual axis detection circuit 101, the visual axis calibration data are calculated (step 328). The calculation method of the visual axis calibration data is as described earlier.

After the visual axis calibration data have been calculated or the visual axis detection has been completed, the timer is reset (step 329).

Also, the visual axis detection circuit 101, which dually serves as means to determine the reliability of the calibration data, determines whether the calculated visual axis calibration data are correct or not (step 332). This determination is effectuated by the use of the reliability of the eyeball rotation angles and pupil diameter as well as the calculated visual axis calibration data themselves.

In other words, if the eyeball rotation angles and pupil diameter detected by the subroutine of the "visual axis detection" are not reliable, it is determined that the calculated visual axis calibration data are not reliable, either. Also, if the eyeball rotation angles and pupil diameter calculated by the subroutine of the visual axis detection are reliable, it is determined that the calculated calibration data are correct when these data are within the general individual variations, but it is determined that the calculated visual axis calibration data are incorrect when these data deviate greatly from the general individual variations.

Also, the visual axis detection circuit 101 not only determines whether the calculated visual axis calibration data are correct, but also determines the degree of the reliability of these data thus calculated. It is needless to mention that the degree of the reliability depends on the reliability and others of the eyeball rotation angles and pupil diameter detected by the visual axis detection subroutine. The reliability of the visual axis calibration data are stored in the EEPROM 100a of the CPU 100 after being binary coded in two bits depending on its degrees.

If the calculated visual axis calibration data are found to be incorrect (step 330), the LED driving circuit 106 suspends the charge to the superimpose LED 21 to turn off the targets 1 and 2 (step 337). Further, the visual axis detection circuit 101 uses the sound generator (not shown) through the CPU 100 to cause it to make an electronic sound different from the one sounded at the time of the completion of the detection for a given period of time. This is a warning sound to indicate that the visual axis calibration has failed. At the same time, a signal is transmitted to the LCD driving circuit 105 to blink the "CAL" displays in the finder LCD 24 and monitor LCD 42 to make the warning (step 340) (refer to FIG. 22A and FIG. 23A). After having made the warning sound by the sound generator (not shown) and the warning displays in the LCDs 24 and 42 for a given period of time, the process will return to the initial step of the calibration routine (step 301) in order to set the visual axis calibration in a state where it can be executed again.

Also, if the calculated visual axis calibration data are correct (step 330), the visual axis detection circuit 101 displays the completion of the visual axis calibration through the LCD driving circuit 105 and LED driving circuit 106 (step 331).

Figure 22B:
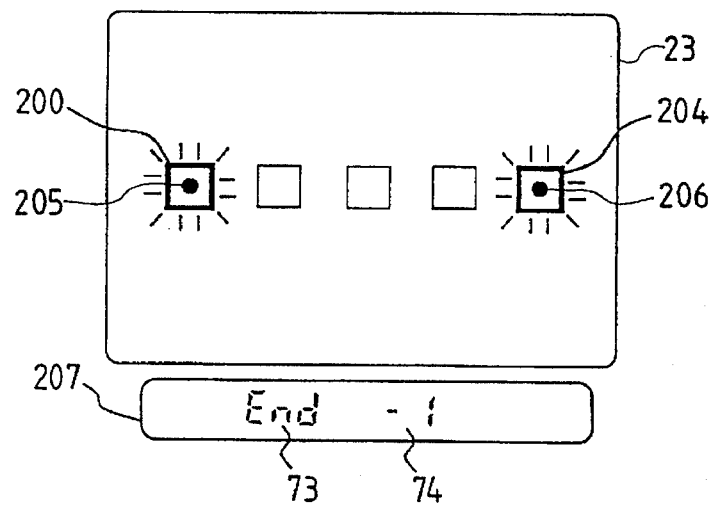
Figure 23A:
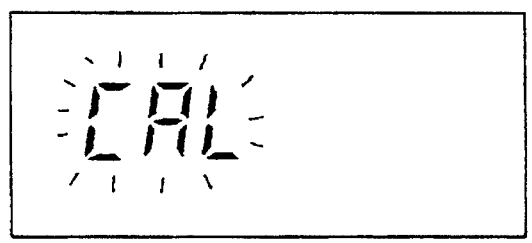
FIGS. 23A and 23B are also views showing the display of the LCD in the finder in order to stand by the descriptions of the operations in FIG. 14 to FIG. 16.
Figure 23B:
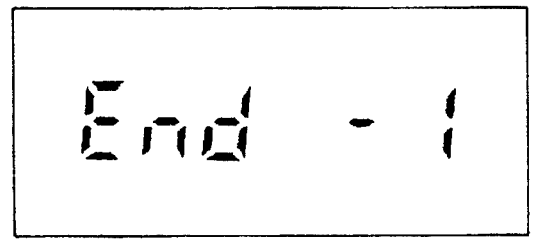
Figure 25:
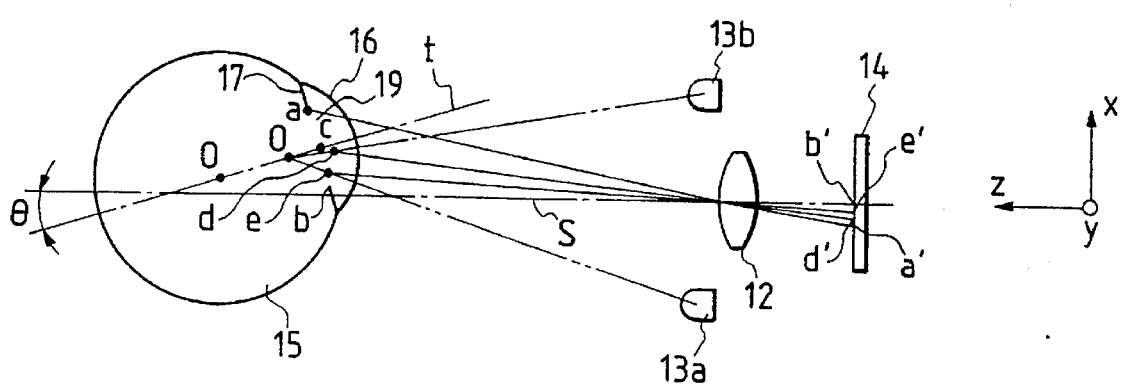
FIG. 25 is a view illustrating a general method of visual axis detection.
Figure 26A:
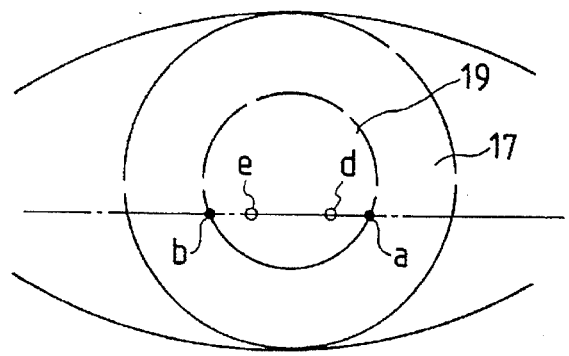
FIG. 26A and FIG. 26B are also views illustrating a general method of visual axis detection.
Figure 26B:
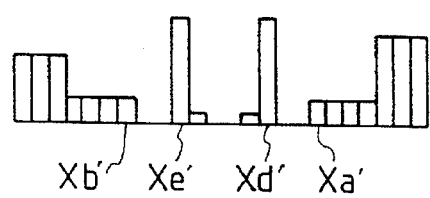

The LED driving circuit 106 charges the superimposed LED 21 to blink the visual targets 1 and 2 several times, and at the same time, the LCD driving circuit 105 transmits a signal to the LCDs 24 and 42 to allow them to display "End-calibration No" for a given period of time (refer to FIG. 22B and FIG. 23B).

The visual axis detection circuit 101 sets the visual axis detection number n at "1" (step 332), and further, stores the calculated visual axis calibration data, the photographer's spectacle information, and the reliability of the calculated visual axis calibration data in the addresses on the EEPROM 100a corresponding to the currently set calibration data number (step 333). At this juncture, if any calibration data have already been stored at the designated addresses, the calibration data are updated.

After the series of the visual axis calibration operations have been completed, the camera will be on standby until the photographer operates either the electronic dial 45 or the mode dial 44. If the photographer rotates the electronic dial 45 to select another calibration number, the visual axis detection circuit 101 detects the change in the calibration numbers through the signal input circuit 104 (step 335). The process will return to the initial step of the visual axis calibration routine (step 301).

Also, if the photographer rotates the mode dial 44 to select another photographing mode, the visual axis detection circuit 101 detects the change in the photographing modes through the signal input circuit 104 (step 335). The process will return to the main routine (step 346).

In returning to the main routine, if there is no input of the calibration data in the calibration number set up in the electronic dial 45, and such number still shows the initial values, the visual axis detection circuit 101 resets the calibration data number to "zero" and sets the visual axis prohibition mode forcibly. In practice, the currently set calibration data number stored in the EEPROM 100a of the CPU 100 is reset to "zero" (visual axis prohibition mode).

In the present embodiment, while an example is illustrated, in which the visual axis detection numbers per visual target point are ten times, it may be possible to make it more than ten times or less than ten times.

According to the present embodiment, the diaphragm of the photographing lens is not opened or closed per execution of the calibration, but the individual variation data are obtained once each on the left and right in a certain brightness, which are being accumulated for the calculation of the correction data. Hence, the arrangement is made so that the individual variation data obtained several times are utilized. Therefore, it becomes possible to reduce the influences brought about by errors in the detection. In this respect, if there has been no execution of any calibrations even once in the past, the correction data are calculated from the one-time individual variation data.

Also, it is possible to input the individual variation data several times and, therefore, obtain the data on the pupil which is actually in use.

The embodiment set forth above relates to the case where the calibration is executed several times in order to update the calibration data, but the following embodiment relates to the handling of the plural data to be obtained during a one-time operation of the calibration.

Figure 15:
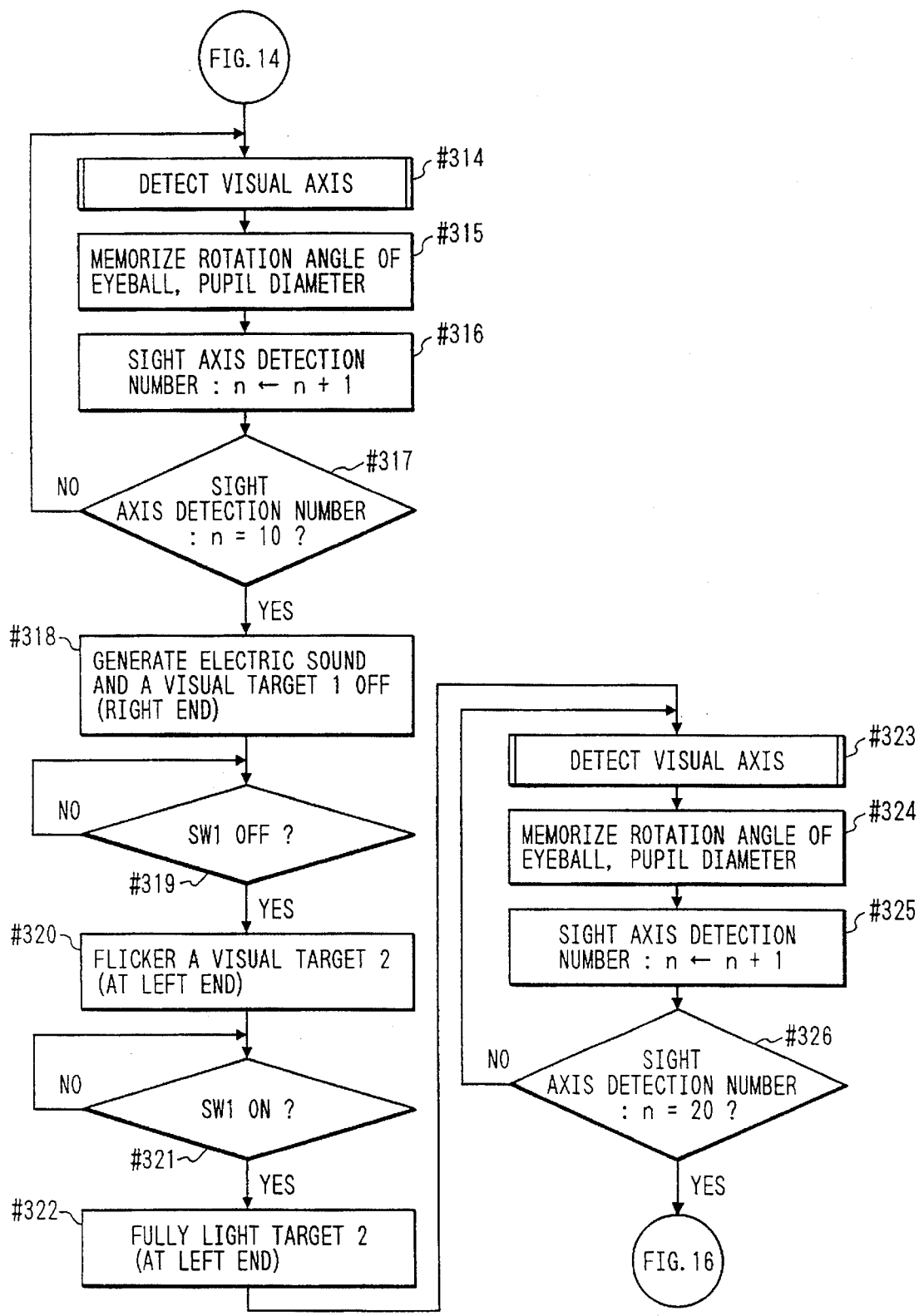
FIG. 15 is a flowchart showing a continuation of the operation shown in FIG. 14.
Figure 16:
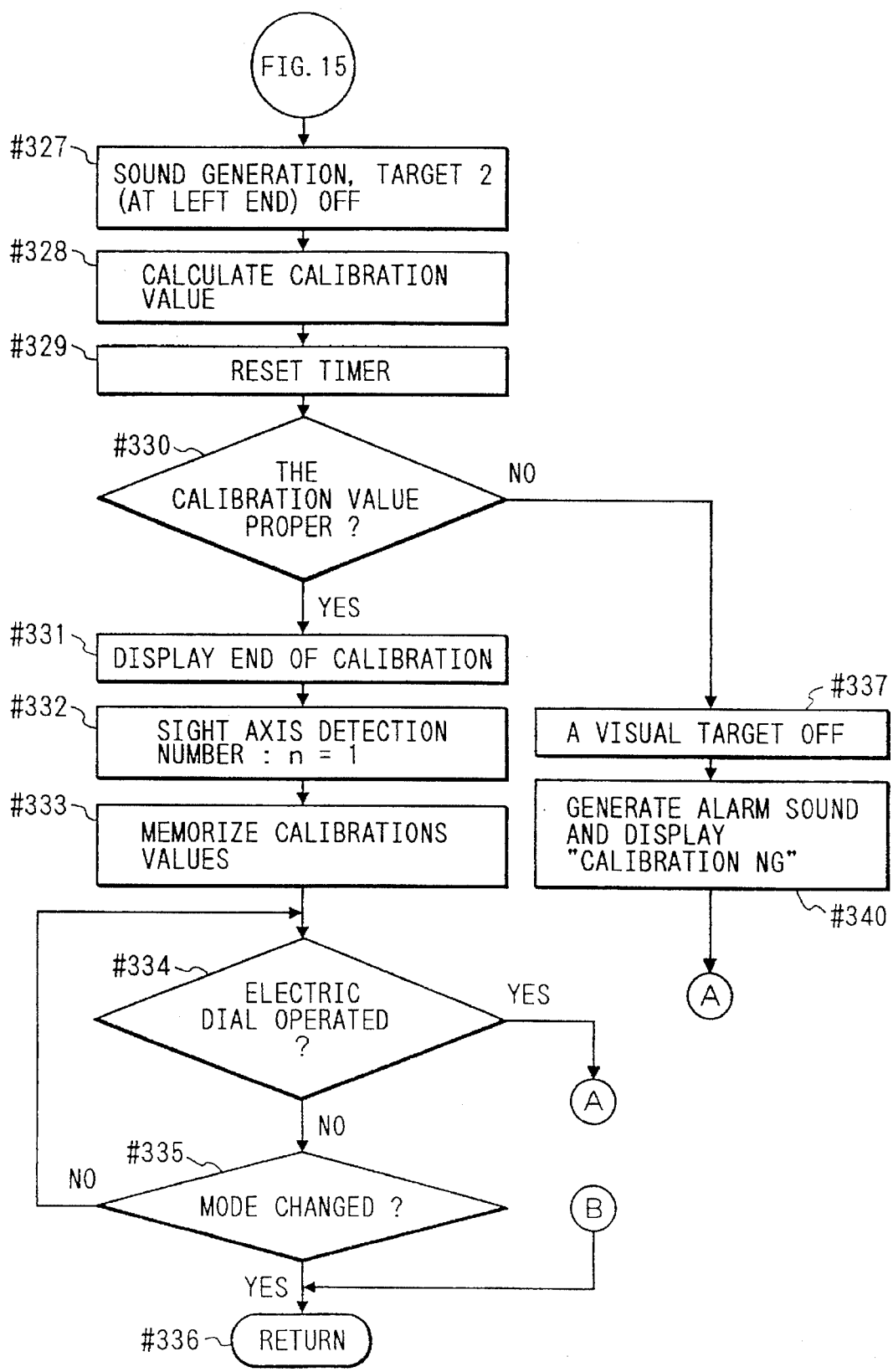
FIG. 16 is a flowchart showing a continuation of the operation shown in FIG. 15.

When the visual axis data detection is completed by the steps to 326 in FIG. 15 for the preparation of the calculation of visual axis calibration data, the visual axis calibration data will be calculated in accordance with the eyeball rotation angels θx and θy, and pupil diameter Rpp stored in the visual axis detection circuit 101 (step 328). The calculation method of the visual axis calibration data are as follows:

Here, the coordinates of the visual targets 1 and 2 on the imaging plate 7 are given as (X1 and 0), (X2 and 0), respectively, and the means value of the ten-time detections of the eyeball rotation angles (θx and θy) at the time of observing each of the visual targets attentively, which are stored in the visual axis detection circuit 101 are given as ( $\bar{\theta}x1$ and $\bar{\theta}y1$), ($\bar{\theta}x2$ and $\bar{\theta}y2$), where ($\bar{\theta}x1$ and $\bar{\theta}y1$) is the mean value of the eyeball rotation angles detected when the photographer watches the visual target 1 attentively, and ( $\bar{\theta}x2$ and $\bar{\theta}y2$) is the mean value of the eyeball rotation angles detected when the photographer watches the visual target 2 attentively. Also, the standard variations of the eyeball rotation angles when watching each of the visual targets attentively are defined as δx1, δy1, δx2, and δy2. The threshold values θth used for excluding the mean values which are greatly deviated from the means values of the eyeball rotation angles are defined as follows:

$\theta thx1 = \sigma x1$ $\theta thx1 = 1.5 * \sigma y1$ $\theta thx2 = \sigma x2$ $\theta thy2 = 1.5 * \sigma y2$ Here, the reason why the threshold values with respect to the standard deviation of the eyeball rotation angles are in the different magnification in the x (horizonal) direction and y (vertical) direction is that the required precision with which to detect the visual axis differ in each of the rotational directions.

Now, after excluding the rotation angles having the difference between the eyeball rotation angle and the mean value $|\theta - \bar{\theta}|$ which exceeds the threshold value θth, the mean values of each of the rotation angles are given as $\bar{\theta}x1$, $\bar{\theta}y1$, $\bar{\theta}x2$, and $\bar{\theta}y2$. Also, the means values of each of the pupil diameters are given as $\bar{R}pp1$ and $\bar{R}pp2$ after excluding the rotation angles having the difference between the eyeball rotation angle and the mean value $|\theta - \bar{\theta}|$ which exceeds the threshold value θth.

At first, the description will be made of the operation in the horizontal (x) direction.

Since the detected rotation angle θx depends on the pupil diameter Rpp, the relation can be expressed as follows:

$$\theta x = Kx * Rpp + Lx \qquad (49)$$

Now, the coefficients Kx and Lx in the equation (49) are assumed to be the primary functions of the visual axis coordinates, and the following relations are established:

$$Kx = Ax * X/m + Cx \qquad (50)$$

$$Lx = Bx * X/m + Dx \qquad (51)$$

Given the rotation angle θx1 and the pupil diameter $\bar{R}pp1$ after the above-mentioned data processing when watching the visual target 1 (horizontal coordinates X1) under a certain bright environment as $\bar{\theta}x1$ and $\bar{\theta}pp1$, the following equations are satisfied:

$$\theta x1 = Kx1 * \bar{R}pp1 + Lx1 \qquad (52)$$

$$Kx1 = Ax * X1/m + Cx \qquad (53)$$

$$Lx1 = Bx * X1/m + Dx \qquad (54)$$

Likewise, in the visual target 2 (horizontal coordinates X2), the following equations are satisfied:

$$\bar{\theta}x2 = Kx2 * \bar{R}pp2 + Lx2 \qquad (55)$$

$$Kx2 = Ax * X2/m + Cx \qquad (56)$$

$$Lx2 = Bx * X2/m + Dx \qquad (57)$$

When the Kx1 and Lx1 in the equation (52) and the Kx2 and Lx2 in the equation (55) are determined by the method which will be described later, the operation will be executed as follows by the application of the equations (53) and (56):

$$Ax = \frac{m * (K \times 1 - K \times 2)}{X1 - X2} \qquad (58)$$

$$Cx = \frac{K \times 1 + K \times 2}{2} \qquad (59)$$

-continued $$Bx = \frac{m*(L\times 1 - L\times 2)}{X1 - X2} \quad (60)$$

$$Dx = \frac{L\times 1 + L\times 2}{2} \quad (61)$$

Now, the visual axis coordinates in the vertical direction can be obtained by the application of the equation (14), but the calibration data Ay to Dy in the vertical direction are calculated as follows:

Since the detected rotation angle θy depends on the pupil diameter Rpp, the relation can be expressed as follows:

$$\theta y = Ky*Rpp + Ly \quad (62)$$

The coefficients Ky and Ly of the equation (62) is assumed to be the primary functions of the visual axis coordinates, the following relations can be satisfied:

$$ky = Ay*Y/m + Cy \quad (63)$$

$$Ly = By*Y/m + Dy \quad (64)$$

Now, the two visual targets for the visual axis calibration are positioned apart from each other in the horizontal direction, but in the vertical direction, these are of the same coordinates. Therefore, although the calibration data Ax to Dx can be obtained as described above, the calibration data Ay to Dy in the vertical direction cannot be obtained in the same way.

Therefore, the following assumption will be given to the denominator of the equation (7):

$$Ay*Rpp + By = Ax*Rpp + Bx = \text{constant}$$

Thus, $$Ay = 0 \quad (24)$$

$$By = Ax*\bar{R}pp + Bx = \text{constant} \quad (25)$$

where $\bar{R}pp$ represents the mean value of the pupil diameters detected several times. Also, by the application of the equations (22) and (23), $$Cy = Ky \quad (26)$$

$$Dy = Ly - By*Y/m$$

Now, the visual axis coordinates Y in the vertical direction are 0. Therefore, $$Dy = Ly \quad (27)$$

In this respect, the Kx1, Lx1, Kx2, Lx2, Ky and Ly can be obtained by operations using the equations (22) to (33) as has been already described.

What is claimed is:

1. A visual axis detection apparatus, comprising:

visual information detection means to detect the rotation angles of the optical axis of an eyeball of an observer, and detect the visual information of the observer with said rotation angles;

correction data storage means to store correction data for the correction of errors in the detected visual information;

individual variation data detection means to detect individual variation data related to the visual axis of the observer;

correction data updating means to update the correction data on the basis of new individual variation data to be detected by said individual variation data detection means and the correction data stored in said correction data storage means; and visual axis calculation means to correct the detected visual information by using the correction data which are updated by said correction data updating means and stored by said correction data storage means.

2. A visual axis detection apparatus according to claim 1, wherein said correction data include the statistical quantity of a plurality of individual variation data.

3. A visual axis detection apparatus according to claim 2, wherein said correction data include the statistical quantity of a plurality of individual variation data by regarding the latest data as important.

4. A visual axis detection apparatus according to claim 1, wherein said visual axis calculation means selects one of plural correction calculation methods, to execute the correction operation in accordance with the statistical quantity of the correction data stored in said correction data storage means.

5. A visual axis detection apparatus according to claim 4, wherein the plural correction methods include at least a method which uses the simple mean of the individual variation data, and a method which uses the least squares.

6. A visual axis detection apparatus according to claim 1, wherein said individual variation detection means excludes the prime data which do not agree with the standard by comparing a plurality of prime data with a given value, and defines the individual variation data on the basis of the remaining prime data.

7. A visual axis detection apparatus, comprising:

calculating means for detecting rotation angle information of an eyeball of an observer, calculating an individual variation of the visual axis of the observer, and determining a direction of the visual axis from the rotation angle information;

targeting means for causing the observer to watch visual targets attentively, and collecting rotation angle information several times; and correction means for calculating a mean value of a plurality of rotation angle information values, and a difference between each of the plurality of rotation angle information values and the mean value, extracting correct rotational angle information by comparing each of the calculated differences with a threshold value, and forming correction information for correcting a personal difference of the visual axis based on the extracted correct rotational angle information.

8. A visual axis detection apparatus according to claim 7, wherein the threshold value is different when applied to the rotation of the eyeball in the horizontal direction as compared to the vertical direction.

9. A visual axis detection apparatus according to claim 7, wherein the threshold value, θth, satisfies the relation of $$\theta th > \sigma$$

where the standard deviation of the plurality of rotation angles information of the eyeball is σ.

10. A visual axis detection apparatus, comprising:

photodetecting means to receive light from an eyeball of an observer;

calculation means to calculate the rotation angles of the eyeball from the eyeball images of the observer obtained by said photodetecting means, correct the individual variations of the visual axis of the observer from the said rotation angles, and obtain the observing positions on the observation plane; and means to calculate said visual axis correction data by excluding the rotation angles having difference between the mean value θ of the rotation angles of the eyeball and each of the rotation angles of the eyeball which is greater than a given value θth in order to obtain the visual axis correction coefficients to correct the individual variations of the visual axis by detecting the rotation angles of the eyeball of the observer plural times.

11. A visual axis detection apparatus according to claim 10, wherein said threshold value θth is different when applied to the rotation of the eyeball in the horizontal direction and in the vertical direction.

12. A visual axis detection apparatus according to claim 10, wherein said threshold value θth satisfies the relation of $$\theta th \geq \sigma$$

where the standard deviation of the rotation angles of the eyeball is σ.

13. A method for determining a rotational angle of an eyeball, comprising the steps of:
 detecting a plurality of data values corresponding to the rotational angle;
 identifying improper data values from among the plurality of data values; and
 obtaining the rotational angle of the eyeball using data values corresponding to the rotational angle excluding the improper data values.

14. A method according to claim 13, wherein said identifying step comprises the steps of calculating a mean value of the plurality of data values, comparing each value of said plurality of data values with the mean value, and identifying improper data as data having a difference between each detected data value thereof and the calculated mean value which is above a threshold value.

15. A method according to claim 14, wherein in the identifying step the threshold value is set to be greater than or equal to a value of a standard deviation of the plurality of data values.

16. A method according to claim 13, wherein said obtaining step comprises a step for calculating a mean value of a plurality of data values excluding improper data values, and the calculated mean value is regarded as the rotational angle of the eyeball.

17. A method according to claim 13, wherein in the detecting step the plurality of data values are formed by detecting a positional relationship between an image of a pupil of the eyeball and a Purkinje's image of the eyeball a plurality of times.

18. A method according to claim 13, further comprising a step of detecting data relating to a diameter of a pupil of the eyeball counterpart for each of the plurality of data values corresponding to the rotational angle, wherein the rotational angle of the eyeball is obtained using (a) the plurality of data values corresponding to the rotational angle excluding improper data values and (b) data values relating to the diameter of the pupil of the eyeball counterpart to the plurality of data values corresponding to the rotational angle excluding improper data.

19. A visual axis detection apparatus comprising:
 a sensor that supplies an electrical signal that varies in accordance with rotation of an eyeball; and
 a signal processing apparatus that receives the electrical signal and detects direction of a visual axis of the eyeball,
 wherein said signal processing apparatus forms a plurality of data values corresponding to a rotational angle of the eyeball, identifies improper data values from among the plurality of data values, and obtains the rotational angle of the eyeball using data corresponding to the rotational angle excluding improper data values identified by said signal processing apparatus.

20. An apparatus according to claim 19, wherein said signal processing apparatus performs a predetermined calculation with the rotational angle of the eyeball and forms correction data for use when the direction of the visual axis is detected, and
 wherein said signal processing apparatus detects a position of the visual axis using the rotational angle of the eyeball obtained based on the electrical signal and the correction data.

21. An apparatus according to claim 20, wherein said signal processing apparatus obtains the rotational angle of the eyeball by detecting a positional relationship between an image of a pupil of the eyeball and a Purkinje's image.

22. An apparatus according to claim 19, wherein said signal processing apparatus calculates a mean value of the plurality of data values, compares each value of the plurality of data values with the mean value, and identifies improper data as data having a difference between each value thereof and the mean value which is more than a threshold value.

23. An apparatus according to claim 22, wherein the threshold value is set to be greater than or equal to a value of a standard deviation of the plurality of data.

24. An apparatus according to claim 19, wherein said signal processing apparatus calculates a mean value of a plurality of data values excluding improper data values identified by said signal processing apparatus, and wherein the calculated mean value is regarded as the rotational angle of the eyeball.

25. An apparatus according to claim 19, wherein said signal processing apparatus forms the plurality of data values by detecting a positional relationship between an image of a pupil of the eyeball and a Purkinje's image of the eyeball a plurality of times.

26. An apparatus according to claim 19, wherein said signal processing apparatus detects data relating to a diameter of a pupil of the eyeball, said data being counterpart to each of the data values corresponding to the rotational angle, wherein the signal processing apparatus obtains the rotational angle of the eyeball using (a) data corresponding to the rotational angle of the eyeball excluding improper data identified by said signal processing apparatus and (b) the data relating to the diameter of the pupil of the eyeball counterpart to the data corresponding to the rotational angle of the eyeball excluding the improper data.

27. An optical apparatus comprising:
 a sensor that supplies an electrical signal that varies in accordance with rotation of an eyeball; and
 a signal processing apparatus that receives the electrical signal and detects a direction of a visual axis of the eyeball, wherein said signal processing apparatus forms a plurality of data values corresponding to a rotational angle of the eyeball, identifies improper data values from among the plurality of data values, and obtains the rotational angle of said eyeball using data values corresponding to a rotational angle of the eyeball excluding improper data values identified by said siqnal processing apparatus.

28. An optical apparatus according to claim 27, further comprising a viewfinder and a phototaking optical system.

29. A visual axis detection method comprising the steps of:
 storing information relating to a personal eyeball;

detecting a rotational angle of the eyeball;

detecting a direction of a visual axis of the eyeball using personal data formed by information stored in the storing step and the rotational angle detected in the detecting step; and renewinq a value of personal data using information previously stored in the storing step and new information input when new information relating to the eyeball is detected.

30. A method according to claim 29, wherein the step of detecting a visual axis includes forming personal data including coefficients in an arithmetic expression for detecting a direction of the visual axis.

31. A method according to claim 29, wherein the step of detecting the rotational angle includes detecting a positional relationship between an image of a pupil of the eyeball and a Purkinje's image of the eyeball.

32. A method according to claim 29, further comprising a step of storing a value of the personal data.

33. A method according to claim 29, further comprising a step of adding stored information to new information and storing the sum as stored information.

34. A method according to claim 29, wherein the step of detecting a visual axis includes forming personal data by performing a predetermined calculation with correction data obtained by processing the stored information.

35. A method according to claim 34, wherein the stored information and the new information comprise data relating to a rotational angle of the eyeball when a visual target is gazed upon.

36. A method according to claim 35, wherein the stored information and the new information further comprise data relating to a diameter of a pupil of the eyeball when the visual target is gazed upon.

37. A method according to claim 35 or 36, wherein the correction data are formed by a process of simple mean using data of the stored information.

38. A method according to claim 35 or 36, wherein the correction data are formed by a process of least squares using data of the stored information.

39. A method according to claim 35 or 36, wherein the correction data are formed by any one of (a) a process of simple mean and (b) a process of least squares, in accordance with a quantity of the data of the information.

40. A method according to claim 35 or 36, wherein said renewinq step includes obtaining new correction data using a value of a sum of a data value of the stored information and a data value of new information, and renewinq a value of the personal data by performing a predetermined calculation with the new correction data.

41. A method according to claim 40, wherein when a difference of values of data relating to a diameter of a pupil of the eyeball between the stored information and the new information is smaller than a predetermined value, then a weight of the value of the data of the stored information is decreased to add the decreased value to the new information data.

42. A visual axis detection apparatus comprising:

a sensor that supplies an electrical signal that varies in accordance with rotation of an eyeball;

storing means for storing information relating to an eyeball of a person; and a signal processing apparatus that receives the electrical signal and detects a direction of a visual axis of the eyeball, wherein said signal processing apparatus detects a rotational angle of the eyeball based on the electrical signal and detects the direction of the visual axis of the eyeball using personal data formed by information stored in said storing means and the rotational angle, and wherein the signal processing apparatus renews the personal data formed by the information stored in said storing means using stored information and new information when new information relating to the eyeball is detected.

43. An apparatus according to claim 42, wherein the personal data are coefficients in an operational equation for detecting the direction of visual axis.

44. An apparatus according to claim 42, wherein the rotational angle of the eyeball is detected based on a positional relationship between an image of a pupil of the eyeball and a Purkinje's image of the eyeball.

45. An apparatus according to claim 42, wherein said storing means further stores a value of the personal data.

46. An apparatus according to claim 42, wherein said storing means stores a sum of the stored information and the new information.

47. An apparatus according to claim 42, wherein said signal processing apparatus forms the personal data by performing a predetermined calculation with correction data obtained by processing the information.

48. An apparatus according to claim 47, wherein the stored information and the new information comprise data relating to a rotational angle of the eyeball when a visual index is gazed upon.

49. An apparatus according to claim 48, wherein the stored information and the new information further comprise data relating to a diameter of a pupil of the eyeball when the visual index is gazed upon.

50. An apparatus according to claim 48 or 49, wherein the correction data are formed by a process of simple mean using the data of the information.

51. An apparatus according to claim 48 or 49, wherein the correction data are formed by a process of least squares using the data of the information.

52. An apparatus according to claim 48 or 49, wherein the correction data are formed by any one of (a) a process of simple mean and (b) a process of least squares, in accordance with a quantity of the data of the information.

53. An apparatus according to claim 48 or 49, wherein new correction data are obtained by using a value of a sum of a data value of the stored information and a data value of new information, and a value of the personal data is renewed by performing a predetermined calculation with the new correction data.

54. An apparatus according to claim 53, wherein when a difference between a value of data relating to a diameter of a pupil of the eyeball in the stored information and a value in the new information is smaller than a predetermined value, then a weight of a value of the data of the stored information is decreased to add the decreased value thereof to the new information data.

55. An optical apparatus comprising:

a sensor that supplies an electrical signal that varies in accordance with rotation of an eyeball;

storing means for storing information relating to a personal eyeball; and a signal processing apparatus that receives the electrical signal and detects a direction of a visual axis of the eyeball, wherein said signal processing apparatus detects a rotational angle of the eyeball based on the electrical signal and detects the direction of the visual axis of the eyeball using personal data formed by stored information and the rotational angle, and renews a value of the personal data using stored information and new information when new information relating to the eyeball is detected.

56. An optical apparatus according to claim 55, further comprising a viewfinder and a phototaking optical system.

* * * * *

UNITED STATES PATENT AND TRADEMARK OFFICE
CERTIFICATE OF CORRECTION

PATENT NO. : 5,634,141
DATED : May 27, 1997
INVENTOR(S) : AKIRA AKASHI, ET AL.

Page 1 of 3

It is certified that error appears in the above-identified patent and that said Letters Patent is hereby corrected as shown below:

Column 4

Line 52, "and" should read --and 2B.--
Line 54, "shown" should be deleted.
Line 55, "dial" should read --dial shown--.

Column 6

Line 21, "$\theta x=$" should read --$\theta x1=$--.
Line 59, "angle ey" should read --angle $\theta y$--.

Column 8

Line 23, "$*\theta Y)$" should read --$*\theta y)$--.
Line 27, "the" should be deleted.
Line 50, "tm" should be deleted.

Column 9

Line 15, "$Rpx1\theta x1$" should read --$Rpx1*\theta x1$".

UNITED STATES PATENT AND TRADEMARK OFFICE
CERTIFICATE OF CORRECTION

PATENT NO. : 5,634,141

DATED : May 27, 1997

INVENTOR(S) : AKIRA AKASHI, ET AL.

It is certified that error appears in the above-identified patent and that said Letters Patent is hereby corrected as shown below:

Column 11

Line 50, "FIGS. 5A and" should read --FIG. 5A--

Column 17

Line 31, "Judged" should read --judged--.

Column 19

Line 23, "rectangular." should read --rectangle--.
Line 24, "retangular." should read --rectangle--.

Column 21

Line 38, "the" (second occurrence) should be deleted.

Column 28

Line 40, "$\bar{\theta}$ppl," should read --$\bar{R}$ppl,--.
Line 43, "$\theta$x1" should read --$\theta$x1--.

UNITED STATES PATENT AND TRADEMARK OFFICE
CERTIFICATE OF CORRECTION

PATENT NO. : 5,634,141

DATED : May 27, 1997

INVENTOR(S) : AKIRA AKASHI, ET AL.

It is certified that error appears in the above-identified patent and that said Letters Patent is hereby corrected as shown below:

Column 29

Line 36, "constant(25)" should read --constant (25)--.

Column 32

Line 61, "siqnal" should read --signal--.

Column 33

Line 6, "renewinq" should read --renewing--.
    Line 46, "renewinq" should read --renewing--.

Signed and Sealed this

Twenty-third Day of December, 1997

Attest:

BRUCE LEHMAN

Attesting Officer      Commissioner of Patents and Trademarks